(12) United States Patent
Narikawa et al.

(10) Patent No.: US 11,804,900 B2
(45) Date of Patent: Oct. 31, 2023

(54) COMMUNICATION NETWORK SYSTEM

(71) Applicant: NIPPON TELEGRAPH AND TELEPHONE CORPORATION, Tokyo (JP)

(72) Inventors: Satoshi Narikawa, Musashino (JP); Tatsuya Fukui, Musashino (JP); Takahito Kirihara, Musashino (JP); Katsuya Minami, Musashino (JP); Satoshi Ikeda, Musashino (JP); Shunsuke Saruwatari, Musashino (JP); Takashi Watanabe, Musashino (JP); Kazuhiko Kinoshita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 23 days.

(21) Appl. No.: 17/620,969

(22) PCT Filed: Jun. 10, 2020

(86) PCT No.: PCT/JP2020/022804
§ 371 (c)(1),
(2) Date: Dec. 20, 2021

(87) PCT Pub. No.: WO2020/255815
PCT Pub. Date: Dec. 24, 2020

(65) Prior Publication Data
US 2022/0360332 A1 Nov. 10, 2022

(30) Foreign Application Priority Data
Jun. 21, 2019 (JP) .................. 2019-115642

(51) Int. Cl.
*H04B 10/2575* (2013.01)

(52) U.S. Cl.
CPC ............... *H04B 10/25752* (2013.01)

(58) Field of Classification Search
CPC .................. H04B 10/25753–25756
See application file for complete search history.

(56) References Cited

U.S. PATENT DOCUMENTS

2003/0161637 A1* 8/2003 Yamamoto .......... H04J 14/0206
398/115
2010/0226304 A1* 9/2010 Shoji ....................... H04B 1/40
370/329

(Continued)

FOREIGN PATENT DOCUMENTS

JP 200448200 A 2/2004
JP 2004242224 A 8/2004

(Continued)

OTHER PUBLICATIONS

Shinichi Ichitsubo and Yoshihiro Ishikawa, Group 4 Mobile / Wireless, vol. 1 Wireless Communication Basics, Chapter 2 Wireless Propagation Path / Chapter 9 Wireless Line Design / Standard Ver.1, Institute of Electronics, Information and Communication Engineers Knowledge Base Knowledge Forest, Nov. 9, 2010, http://www.ieice-√hbkb.org/portal.

(Continued)

*Primary Examiner* — Nathan M Cors
(74) *Attorney, Agent, or Firm* — Harness, Dickey & Pierce, P.L.C.

(57) ABSTRACT

The present disclosure aims to make it possible to simultaneously establish communication between many freely-selected radio terminals without using a complex relay network or a plurality of radio relays. The present disclosure is a communication network system including: a plurality of optical-radio converters 521-1 to **521-*n*** that convert a radio signal and an optical fiber radio signal into each other; and a path controller that is connected to the plurality of optical- (Continued)

radio converters 521-1 to 521-*n* through optical fiber transmission lines 531-1 to 531-*n*, receives input of an optical fiber radio signal transmitted from any optical-radio converter of the plurality of optical-radio converters 521-1 to 521-*n* from the optical fiber transmission line connected to the optical-radio converter, and outputs the optical fiber radio signal to the optical fiber transmission line connected to a set optical-radio converter of the plurality of optical-radio converters 521-1 to 521-*n*.

7 Claims, 20 Drawing Sheets

(56) References Cited

U.S. PATENT DOCUMENTS

| | | | | |
|---|---|---|---|---|
| 2010/0290787 | A1* | 11/2010 | Cox | H04B 10/808 |
| | | | | 398/115 |
| 2011/0103806 | A1* | 5/2011 | Eisenwinter | H04B 10/25756 |
| | | | | 398/178 |
| 2016/0380668 | A1* | 12/2016 | Aoki | H04B 1/50 |
| | | | | 370/278 |

FOREIGN PATENT DOCUMENTS

| | | | | |
|---|---|---|---|---|
| JP | 2005110150 A | | 4/2005 | |
| JP | 2010268224 A | | 11/2010 | |
| JP | 2014160967 A | | 9/2014 | |
| JP | 2005159751 | * | 6/2015 | H04B 10/20 |
| JP | 2017017667 A | | 1/2017 | |

OTHER PUBLICATIONS

Shunsuke Saruwatari et al., Examination of communication area expansion between IoT terminals by amplitude delay control circuit and RoF, IEICE 2018 General Conference, Mar. 20, 2018, p. 351.

Takumasa Ishioka et al., Feasibility evaluation of IoT communication area expansion technology by RoF using amplitude delay control circuit, Institute of Electronics, Information and Communication Engineers 2018 Society Conference, Sep. 11, 2018, p. 107.

* cited by examiner

COMMUNICATION NETWORK SYSTEM

CROSS-REFERENCE TO RELATED APPLICATIONS

This application is a 371 U.S. National Phase of International Application No. PCT/JP2020/022804 filed on Jun. 10, 2020, which claims priority to Japanese Application No. 2019-115642 filed on Jun. 21, 2019. The entire disclosures of the above applications are incorporated herein by reference.

TECHNICAL FIELD

The present disclosure relates to a communication network system that enables communication between radio terminals out of the radio propagation distance range in radio communication.

BACKGROUND ART

When a radio terminal communicates with another radio terminal by radio, radio communication can be established only when the radio terminals are within the radio propagation distance range in which a radio signal in a radio scheme used for communication is reachable (see, e.g., Non-Patent Literature 1).

When the radio terminals are out of the radio propagation distance range, communication can be established by employing a configuration in which the radio terminals connect to radio master devices installed within their respective radio propagation distance ranges, and the radio master devices connect to their opposing radio master devices via a relay network composed of network switches, network routers or the like. Alternatively, it is also possible to establish communication between the radio terminals by the radio terminals connecting to radio relays installed within their respective radio propagation distance ranges, and the radio relays establishing radio communication.

FIG. 1 is an example of a form of a communication network system in which radio terminals are connected via a relay network. The communication network system shown in FIG. 1 is configured using radio terminals 111, 112, radio master devices 121, 122, and a relay network 151. The radio master device 121 includes an antenna unit 131 and a transmission function unit 141. The radio master device 122 includes an antenna unit 132 and a transmission function unit 142.

At this time, the radio terminal 111 is connected by radio to the antenna unit 131 of the radio master device 121, the radio master device 121 is connected to the radio master device 122 via the relay network 151, and the antenna unit 132 of the radio master device 122 is connected by radio to the radio terminal 112. Here, the radio master device 121 is connected to the relay network 151 via the transmission function unit 141, and the radio master device 122 is connected to the relay network 151 via the transmission function unit 142. Further, the relay network 151 is generally configured using a plurality of network switches or network routers.

FIG. 2 is an example of a form of a communication network system in which radio terminals are connected via radio relays. The communication network system shown in FIG. 2 includes radio terminals 211, 212 and radio relays 221, 222, 223. The radio relay 221 includes antenna units 231, 232 and a transmission function unit 241. The radio relay 222 includes antenna units 233, 234 and a transmission function unit 242. The radio relay 223 includes antenna units 235, 236 and a transmission function unit 243.

At this time, the radio terminal 211 is connected by radio to the antenna unit 231 of the radio relay 221, the radio relays 221 and 222 are connected by radio via their respective constituent antenna units 232 and 233, the radio relays 222 and 223 are connected by radio via their respective constituent antenna unit 234 and 235, and the antenna unit 236 of the radio relay 223 is connected by radio to the radio terminal 212. The antenna units 231, 232 constituting the radio relay 221 are connected via the transmission function unit 241, the antenna units 233, 234 constituting the radio relay 222 are connected via the transmission function unit 242, and the antenna units 235, 236 constituting the radio relay 223 are connected via the transmission function unit 243.

Although FIG. 2 shows an example in which three radio relays are connected, there is no limitation to a configuration of three radio relays, communication can be established in any case such as in a configuration of one radio relay or in a configuration of two or more radio relays, and it is possible to communicate with a radio terminal at a longer distance as the number of radio relays increases.

However, in the form in which radio terminals are connected via a relay network as in FIG. 1, a plurality of network switches or network routers are required to form the relay network, so that the network configuration becomes complex.

In the form in which radio terminals are connected via radio relays as in FIG. 2, when the distance between the radio terminals is a long distance, it is necessary to establish communication via a plurality of radio relays, so that the configuration becomes complex. When a configuration is made using a small number of radio relays so as not to be complex, the communication distance between the radio terminals will be limited.

Furthermore, since equipment forming the relay network and the radio relays need to be set, controlled, and maintained, a mechanism for managing equipment must be created separately. At this time, as means for easily transmitting a radio signal (high-frequency signal) over a long distance, there have been used the RoF (radio over fiber) technique for transmitting/receiving radio signals through an optical fiber transmission line with low loss and a wide band, and a wraparound signal remover for preventing degradation in quality due to a wraparound radio signal or a wraparound optical fiber radio signal (here, an optical signal that is converted from a radio signal and can be transmitted over an optical fiber is referred to as an optical fiber radio signal) that is generated by a transmitted radio signal being received by an antenna (see, e.g., Non-Patent Literature 2 and Non-Patent Literature 3).

FIG. 3 is an example of a form of a communication network system in which radio terminals are connected using the RoF technique. The communication network system shown in FIG. 3 includes radio terminals 311, 312, optical-radio converters 321, 322, and an optical fiber transmission line 371. The optical-radio converter 321 includes an antenna unit 341 including a transmission antenna 331 and a reception antenna 332, and an optical-radio conversion unit 361. The optical-radio converter 322 includes an antenna unit 342 including a transmission antenna 333 and a reception antenna 334, and an optical-radio conversion unit 362.

At this time, the radio terminal 311 is connected by radio to the antenna unit 341 of the optical-radio converter 321, the optical-radio converter 321 is connected to the optical-radio converter 322 through the optical fiber transmission line 371, and the antenna unit 342 of the optical-radio converter 322 is connected by radio to the radio terminal 312. The optical-radio converter 321 is connected to the optical fiber transmission line 371 via the optical-radio conversion unit 361, and the optical-radio converter 322 is connected to the optical fiber transmission line 371 via the optical-radio conversion unit 362.

The optical-radio conversion units 361 and 362 have a function to convert a radio signal and an optical fiber radio signal into each other. For example, the optical-radio conversion unit 361 converts a radio signal received by the reception antenna 332 into an optical fiber radio signal, and outputs it to the optical fiber transmission line 371. Further, the optical-radio conversion unit 361 converts an optical fiber radio signal transmitted in the optical fiber transmission line 371 into a radio signal, and outputs it to the antenna unit 341. Thereby, the optical-radio converters 321 and 322 perform RoF transmission of radio signals.

A radio signal transmitted from the radio terminal 311 is received by the reception antenna 332, converted by the optical-radio conversion unit 361 into an optical fiber radio signal, and transmitted in the optical fiber transmission line 371. The optical fiber radio signal is converted by the optical-radio conversion unit 362 into a radio signal, and transmitted from the transmission antenna 333 to the radio terminal 312. On the other hand, a radio signal transmitted from the radio terminal 312 is received by the reception antenna 334, converted by the optical-radio conversion unit 362 into an optical fiber radio signal, and transmitted in the optical fiber transmission line 371. The optical fiber radio signal is converted by the optical-radio conversion unit 361 into a radio signal, and transmitted from the transmission antenna 331 to the radio terminal 311.

The communication network system shown in FIG. 3 as described above can connect optical-radio converters only using an optical fiber transmission line not via network switches or network routers used in a relay network, and can also simplify the configuration of an optical-radio converter itself.

CITATION LIST

Non-Patent Literature

Non-Patent Literature 1: The Institute of Electronics, Information and Communication Engineers, Knowledge Base, Knowledge Forest (http://www.ieice-hbkb.org/portal/), Group 4: Mobile and Radio, Part 1: Radio Communication Basics, Chapter 2: Radio Propagation Path and Chapter 9: Radio Line Design and Criteria, Ver. 1, Nov. 9, 2010
Non-Patent Literature 2: Shunsuke Saruwatari, Tatsuya Fukui, Satoshi Narikawa, Takahito Kirihara, Katsuya Minami, Satoshi Ikeda, Kazuhiro Kizaki, Kazuhiko Kinoshita, and Takashi Watanabe, "Study on expansion of communication area between IoT terminals using amplitude delay control circuit and RoF", The Institute of Electronics, Information and Communication Engineers, General Conference 2018, B-18-7
Non-Patent Literature 3: Takumasa Ishioka, Tatsuya Fukui, Satoshi Narikawa, Takahito Kirihara, Katsuya Minami, Satoshi Ikeda, Kazuhiko Kinoshita, Makoto Kobayashi, Kazuhiro Kizaki, Shunsuke Saruwatari, and Takashi Watanabe, "Feasibility evaluation of technique for expanding IoT communication area based on RoF using amplitude delay control circuit", The Institute of Electronics, Information and Communication Engineers, Society Conference 2018, B-8-1

SUMMARY OF THE INVENTION

Technical Problem

However, when the form of the communication network system that connects two sites as in FIG. 3 is extended to connect multiple sites equal to or more than three sites as shown in FIG. 4, a problem occurs as described below. A communication network system shown in FIG. 4 includes a plurality of radio terminals 411-1, 411-2 to 411-$n$, a plurality of optical-radio converters 421-1, 421-2 to 421-$n$, a plurality of optical fiber transmission lines 431-1, 431-2 to 431-$n$, and an optical repeater hub 441. The optical-radio converters 421-1, 421-2 to 421-$n$ have the same configuration as that of the optical-radio converter 321 shown in FIG. 3, and are configured to be connected to the optical repeater hub 441 through the optical fiber transmission lines 431-1, 431-2 to 431-$n$, respectively. The optical repeater hub 441 is configured using, for example, one or a plurality of optical splitters, and transmits an optical fiber radio signal transmitted from the optical-radio converters 421-1, 421-2 to 421-$n$ to all the optical-radio converters 421-1, 421-2 to 421-$n$ except the optical-radio converter as the transmission source.

At this time, in the case where optical fiber radio signals transmitted from the optical-radio converters 421-1, 421-2 to 421-$n$ are transmitted at the same optical wavelength, optical fiber radio signals collide with each other when the optical fiber radio signals are simultaneously transmitted from a plurality of optical-radio converters, and the optical fiber radio signals interfere with each other, so that they cannot be correctly received by the optical-radio converters 421-1, 421-2 to 421-$n$. In this case, by transmitting optical fiber radio signals transmitted from the optical-radio converters 421-1, 421-2 to 421-$n$ at different times (time division multiplexing (TDM)), or transmitting them at different wavelengths (wavelength division multiplexing (WDM)), the collision of the optical fiber radio signals can be avoided.

FIG. 5 is an example in which the collision of optical fiber radio signals is avoided using time division multiplexing in the communication network system shown in FIG. 4. For ease of understanding, some reference numerals shown in FIG. 4 are omitted in FIG. 5. A radio signal transmitted from the radio terminal 411-1 is converted by the optical-radio converter 421-1 into an optical fiber radio signal 451-1 having an optical wavelength $\lambda_1$, and transmitted to the optical repeater hub 441 through the optical fiber transmission line 431-1. The optical repeater hub 441 branches the optical fiber radio signal 451-1, and transmits it to all the optical-radio converters 421-2 to 421-$n$ except the optical-radio converter 421-1 as the transmission source through the optical fiber transmission lines 431-2 to 431-$n$ as optical fiber radio signals 461-2 to 461-$n$, respectively. The optical-radio converters 421-2 to 421-$n$ transmit the radio signal to the radio terminals 411-2 to 411-$n$, respectively. At this time, a mechanism is used in which while the optical-radio converter 421-1 is transmitting the optical fiber radio signal 451-1, the other optical-radio converters 421-2 to 421-$n$ are controlled not to transmit optical fiber radio signals, thereby avoiding the collision of optical fiber radio signals.

When time division multiplexing is used to avoid the collision of optical fiber radio signals, even when the frequency of a radio signal is set to a different channel at each site for avoiding the collision of radio signals, only one radio terminal of the radio terminals at all sites can transmit a radio signal at a time for avoiding the collision of optical fiber radio signals, so that communication efficiency significantly decreases. In particular, in the case of a large-scale communication network system in which many optical-radio converters are connected, a transmittable time assigned per radio terminal significantly decreases, so that the influence becomes noticeable.

FIG. 6 is an example in which the collision of optical fiber radio signals is avoided using wavelength division multiplexing in the communication network system shown in FIG. 4. For ease of understanding, some reference numerals shown in FIG. 4 are omitted in FIG. 6. A radio signal transmitted from the radio terminal 411-1 is converted by the optical-radio converter 421-1 into an optical fiber radio signal 471-1 having the optical wavelength $\lambda_1$, and transmitted to the optical repeater hub 441 through the optical fiber transmission line 431-1. Radio signals transmitted from the other radio terminals 411-2 to 411-$n$ are similarly converted by the optical-radio converters 421-2 to 421-$n$ into optical fiber radio signals 471-2 to 471-$n$ having optical wavelengths $\lambda_2$ to $\lambda_n$, respectively, and transmitted to the optical repeater hub 441 through the optical fiber transmission lines 431-2 to 431-$n$, respectively. The optical repeater hub 441 branches all the optical fiber radio signals 471-1 to 471-$n$, and transmits them to all the optical-radio converters 421-1 to 421-$n$ through the optical fiber transmission lines 431-1 to 431-$n$ as optical fiber radio signals 481-1 to 481-$n$, respectively. Note that each of the optical fiber radio signals 481-1 to 481-$n$ has components in which all the signals of the optical fiber radio signals 471-1 to 471-$n$ are multiplexed except the optical fiber radio signal transmitted from the optical-radio converter as the corresponding transmission source. At this time, a mechanism is used in which the optical-radio converters 421-1 to 421-$n$ receive an optical fiber radio signal having a desired optical wavelength using, for example, an optical wavelength filter in the optical-radio conversion unit, thereby avoiding the collision of optical fiber radio signals.

When wavelength division multiplexing is used to avoid the collision of optical fiber radio signals, a plurality of radio terminals can simultaneously transmit radio signals by selectively receiving the desired optical fiber radio signal using an optical wavelength filter or the like in the optical-radio conversion unit on the reception side, but it is necessary to control the optical wavelengths output from the optical-radio conversion units inside the optical-radio converters to be wavelengths different from each other, or to prepare optical transmitters for outputting different wavelengths, so that the configuration and management of the optical-radio converters become complex. In particular, in the case of a large-scale communication network system in which many optical-radio converters are connected, it becomes necessary to prepare many optical wavelengths at which the optical-radio converters perform transmission, so that the influence becomes noticeable.

Furthermore, in the configuration in FIG. 4, the optical-radio converter 421-1 receives not only a wraparound radio signal generated in the device itself but also wraparound optical fiber radio signals transmitted from the optical-radio converters 421-2 to 421-$n$. The same applies to the optical-radio converters 421-2 to 421-$n$. Thereby, even when the configurations in FIG. 5 and FIG. 6 are employed, not only their respective desired radio signals but also unnecessary radio signals will be received, so that the signal quality degrades. When the signal quality degrades, inconveniences occur, such as a decrease in the radio propagation range or a decrease in the transmission band, and communication cannot be established in the worst case.

Therefore, the present disclosure aims to make it possible to simultaneously establish communication between many freely-selected radio terminals without using a complex relay network or a plurality of radio relays.

Means for Solving the Problem

The present disclosure has decided to provide means for controlling paths of optical fiber transmission lines such as an optical switch or an electrical switch in a communication network system in which a plurality of radio terminals are connected using RoF.

Specifically, a communication network system according to the present disclosure includes:

a plurality of optical-radio converters that convert a radio signal and an optical fiber radio signal into each other; and a path controller that is connected to the plurality of optical-radio converters through optical fiber transmission lines, receives input of an optical fiber radio signal transmitted from any optical-radio converter of the plurality of optical-radio converters from the optical fiber transmission line connected to the optical-radio converter, and outputs the optical fiber radio signal to the optical fiber transmission line connected to a set optical-radio converter of the plurality of optical-radio converters.

Specifically, a communication network system according to the present disclosure includes:

a plurality of communication networks each in which a plurality of optical-radio converters that convert a radio signal and an optical fiber radio signal into each other are connected to an optical repeater hub, and the optical repeater hub transmits an optical fiber radio signal transmitted from any optical-radio converter included in the plurality of optical-radio converters to optical-radio converters other than a transmission source of the plurality of optical-radio converters; and a path controller that is connected to the optical repeater hubs provided in the plurality of communication networks through optical fiber transmission lines, receives input of an optical fiber radio signal transmitted from any optical repeater hub of the plurality of optical repeater hubs from the optical fiber transmission line connected to the optical repeater hub, and outputs the optical fiber radio signal to the optical fiber transmission line connected to a set optical repeater hub of the plurality of optical repeater hubs.

In the communication network system according to the present disclosure, the path controller may include an optical switch that sets a conduction route between freely-selected optical fiber transmission lines of the plurality of connected optical fiber transmission lines.

In the communication network system according to the present disclosure, the path controller may include:

a plurality of path controller-side optical-radio conversion units that are provided for respective optical fiber transmission lines, and each of which is connected to a predetermined optical fiber transmission line, converts an optical fiber radio signal input from the optical fiber transmission line into a radio signal, and converts the radio signal into an optical fiber radio signal to output the optical fiber radio signal to the optical fiber transmission line; and an electrical switch unit that outputs radio signals converted by the plurality of path controller-side optical-radio conversion units, to the path controller-side optical-radio conversion unit determined by the optical fiber transmission line as an output destination.

In the communication network system according to the present disclosure, the plurality of optical-radio converters may each include:

an antenna unit that transmits/receives a radio signal to/from a radio terminal;

an optical-radio converter-side optical-radio conversion unit that converts a radio signal received by the antenna unit into an optical fiber radio signal to output the optical fiber radio signal to the optical fiber transmission line, and converts an optical fiber radio signal transmitted in the optical fiber transmission line into a radio signal to output the radio signal to the antenna unit; and a first wraparound signal suppression circuit that branches the radio signal output from the optical-radio converter-side optical-radio conversion unit to the antenna unit, and suppresses a wraparound radio signal generated by the radio signal output to the antenna unit being received by the antenna unit using the branched radio signal.

In the communication network system according to the present disclosure, the plurality of optical-radio converters may each include:

an antenna unit that transmits/receives a radio signal to/from a radio terminal;

an optical-radio converter-side optical-radio conversion unit that converts a radio signal received by the antenna unit into an optical fiber radio signal to output the optical fiber radio signal to the optical fiber transmission line, and converts an optical fiber radio signal transmitted in the optical fiber transmission line into a radio signal to output the radio signal to the antenna unit; and a second wraparound signal suppression circuit that branches a radio signal output from the antenna unit to the optical-radio converter-side optical-radio conversion unit, and suppresses a wraparound optical fiber radio signal generated by the radio signal output from the antenna unit to the optical-radio converter-side optical-radio conversion unit being received by the antenna unit provided in the set optical-radio converter of the plurality of optical-radio converters using the branched radio signal.

Note that the above disclosures can be combined as long as the combination is possible.

Effects of the Invention

In a case where a plurality of radio terminals out of the radio propagation distance range of each other communicates with each other, the present disclosure can provide a communication machine and a communication network system for enabling many freely-selected radio terminals to simultaneously establish communication without using a complex relay network or a plurality of radio relays.

DESCRIPTION OF EMBODIMENTS

Figure 1:
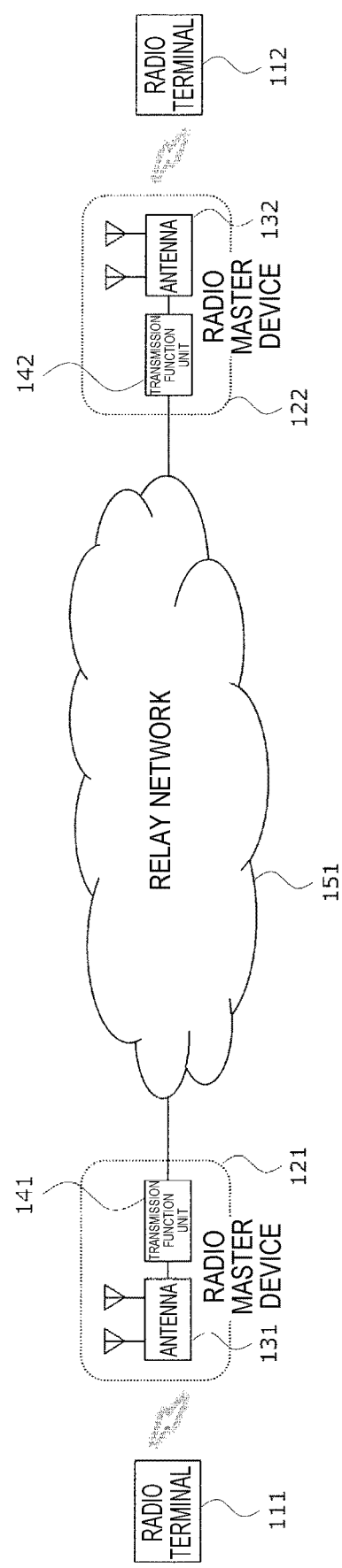
FIG. 1 shows a first example of a communication network system related to the present disclosure.
Figure 2:
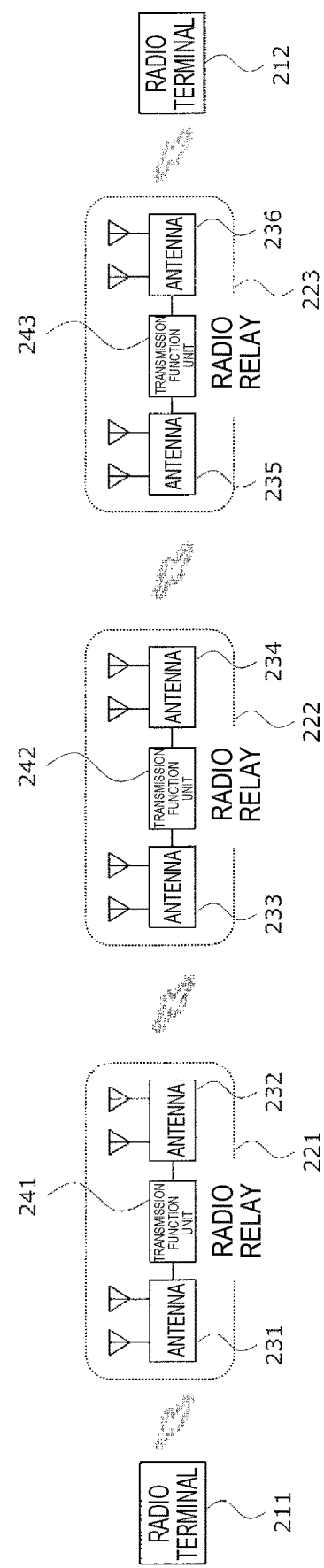
FIG. 2 shows a second example of a communication network system related to the present disclosure.

Hereinafter, embodiments of the present disclosure will be described in detail with reference to the drawings. Note that the present disclosure is not limited to the embodiments described below. These exemplary embodiments are for illustration only, and the present disclosure can be embodied in forms in which various modifications and improvements are made based on the knowledge of those skilled in the art. Note that components having the same reference numeral in the present specification and the drawings are intended to refer to the same one.

First Embodiment

Figure 7:
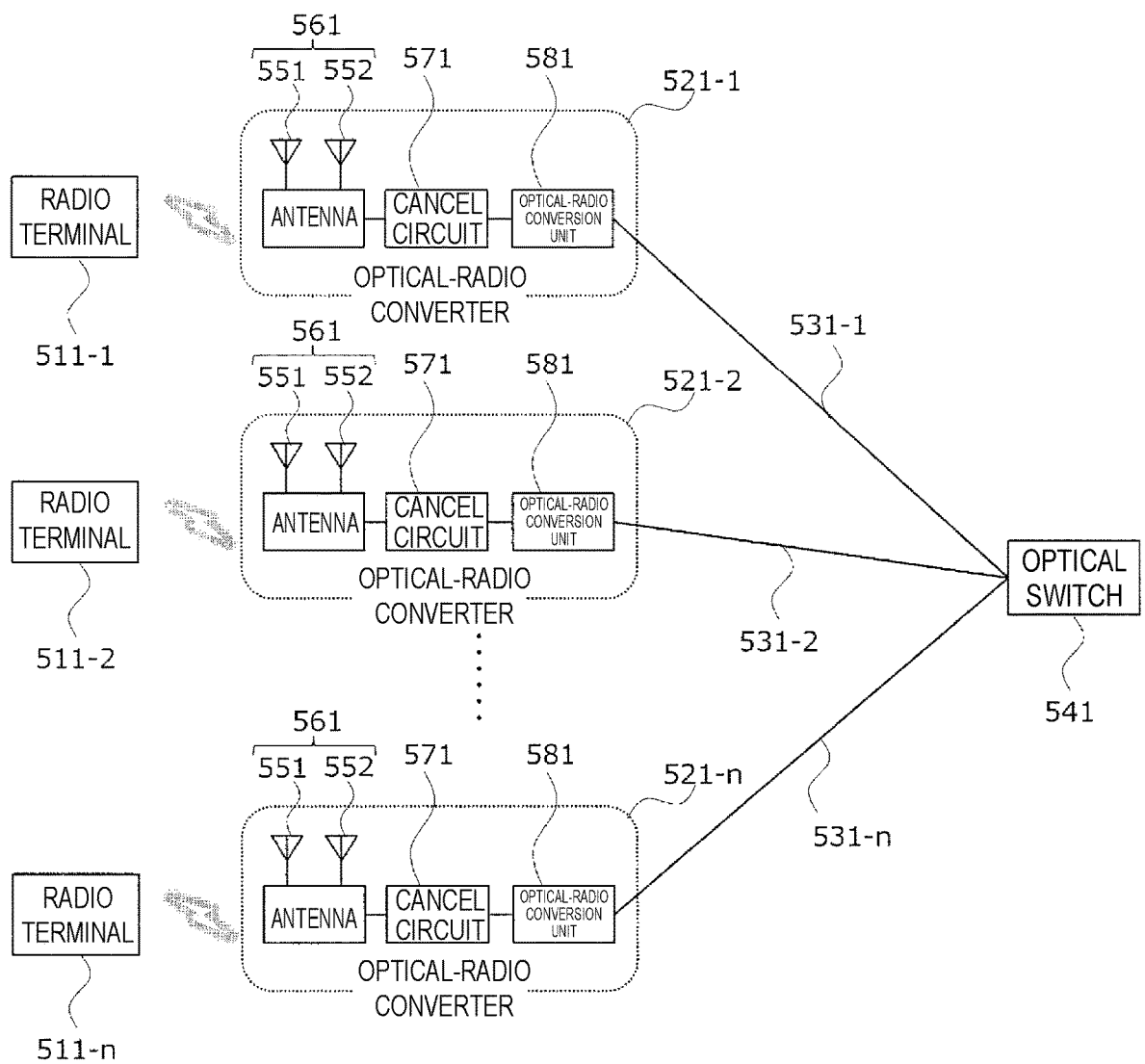
FIG. 7 shows an example of a communication network system according to a first embodiment.

FIG. 7 is a diagram showing a first example of a communication network system in the present disclosure. The communication network system shown in FIG. 7 includes a plurality of radio terminals 511-1, 511-2 to 511-$n$, a plurality of optical-radio converters 521-1, 521-2 to 521-$n$, a plurality of optical fiber transmission lines 531-1, 531-2 to 531-$n$, and an optical switch 541 that functions as a path controller. Here, n is any integer of 2 or more. The optical-radio converters 521-1, 521-2 to 521-$n$ include an antenna unit 561 including a transmission antenna 551 and a reception antenna 552, a cancel circuit 571, and an optical-radio conversion unit 581, and are connected to the optical switch 541 through the optical fiber transmission lines 531-1, 531-2 to 531-$n$, respectively.

The optical-radio conversion unit 581 has a function to convert a radio signal and an optical fiber radio signal into each other. For example, the optical-radio conversion unit 581 provided in the optical-radio converter 521-1 converts a radio signal received by the reception antenna 552 into an optical fiber radio signal, and outputs it to the optical fiber transmission line 531-1. Thereby, the optical-radio converter 521-1 enables the radio signal transmitted from the radio terminal 511-1 to be transmitted in the optical fiber transmission line 531-1. Further, the optical-radio conversion unit 581 provided in the optical-radio converter 521-1 converts an optical fiber radio signal transmitted in the optical fiber transmission line 531-1 into a radio signal, and outputs it to the antenna unit 561 provided in the optical-radio converter 521-1. Thereby, the optical-radio converter 521-1 transmits the optical fiber radio signal transmitted in the optical fiber transmission line 531-1 to the radio terminal 511-1. The same applies to the other optical-radio converters 521-2 to 521-n.

The optical switch 541 controls conduction routes for optical fiber radio signals. For example, when the optical-radio converter 521-1 transmits an optical fiber radio signal to the optical-radio converter 521-2, the optical switch 541 performs control so that the optical fiber transmission line 531-1 and the optical fiber transmission line 531-2 are conductive with each other. Thereby, in this embodiment, it is possible to transmit the optical fiber radio signal only to the desired optical-radio converter 521-2 without transmitting unnecessary optical fiber radio signals to the other optical-radio converters.

Figure 8:
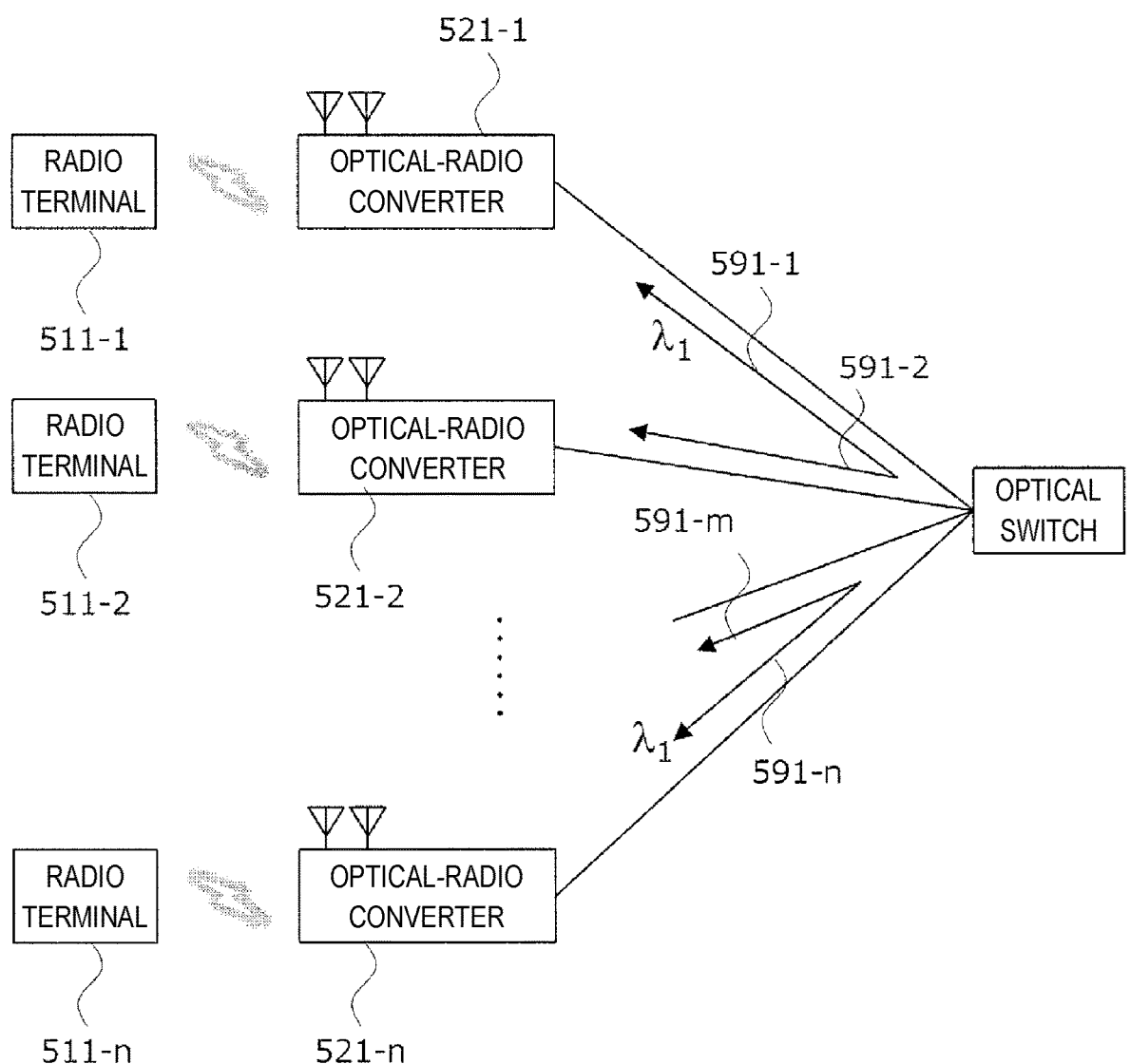
FIG. 8 shows an example of a signal in the communication network system shown in FIG. 7.

FIG. 8 is a diagram showing an example of communication route control by the optical switch in the communication network system shown in FIG. 7. For ease of understanding, a part of the configuration and reference numerals shown in FIG. 7 are omitted in FIG. 8. A radio signal transmitted from the radio terminal 511-1 is converted by the optical-radio converter 521-1 into an optical fiber radio signal 591-1 having the optical wavelength $\lambda_1$, and transmitted to the optical switch 541 through the optical fiber transmission line 531-1. The optical switch 541 controls the destination of the optical fiber radio signal 591-1 to transmit it to the optical-radio converter 521-2 through the optical fiber transmission line 531-2 as an optical fiber radio signal 591-2. Further, a radio signal transmitted from the radio terminal 511-2 is converted by the optical-radio converter 521-2 into the optical fiber radio signal 591-2 having the optical wavelength $\lambda_1$, and transmitted to the optical switch 541 through the optical fiber transmission line 531-2. The optical switch 541 controls the destination of the optical fiber radio signal 531-2 to transmit it to the optical-radio converter 521-1 through the optical fiber transmission line 531-1 as the optical fiber radio signal 591-1. Thereby, communication is established between the radio terminal 511-1 and the radio terminal 511-2.

As the optical switch 541, any optical device can be used that can set the conduction route between the optical fiber transmission lines 531-1 and 531-2 of the plurality of connected optical fiber transmission lines 531-1 to 531-n. For example, as the optical switch 541, an optical switch having n×n ports can be used in which the optical fiber transmission lines 531-1 to 531-n are connected to the input ports and the optical fiber transmission lines 531-1 to 531-n are connected to the output ports. Output ports corresponding to input ports are set at any timing before transmitting the optical fiber radio signals 591-1, 591-2. Note that the method of controlling conduction routes is optional, and can be configured by using an optical switch using electro-optic effect, magneto-optical effect, acousto-optical effect, thermo-optical effect or optical Kerr effect, a semiconductor gate type optical switch, a MEMS (micro electro mechanical systems) type optical switch, or the like, alone or in combination of two or more thereof.

For example, a radio signal transmitted from the radio terminal 511-n is converted by the optical-radio converter 521-n into an optical fiber radio signal 591-n having the optical wavelength $\lambda_1$, and transmitted to the optical switch 541 through the optical fiber transmission line 531-n, although the same applies to radio signals transmitted from the other radio terminals. The optical switch 541 controls the destination of the optical fiber radio signal 531-n to transmit it to another optical-radio converter through another optical fiber transmission line as an optical fiber radio signal 591-m. Here, m is any integer from 1 to n.

In this way, in this embodiment, the optical switch 541 is used to control conduction routes for optical fiber radio signals, thereby enabling only freely-selected optical-radio converters to transmit/receive optical fiber radio signals to/from each other.

Further, in this embodiment, the optical-radio converters 521-1 to 521-n include the cancel circuit 571 that functions as a wraparound signal suppression circuit between the antenna unit 561 and the optical-radio conversion unit 581.

Figure 9:
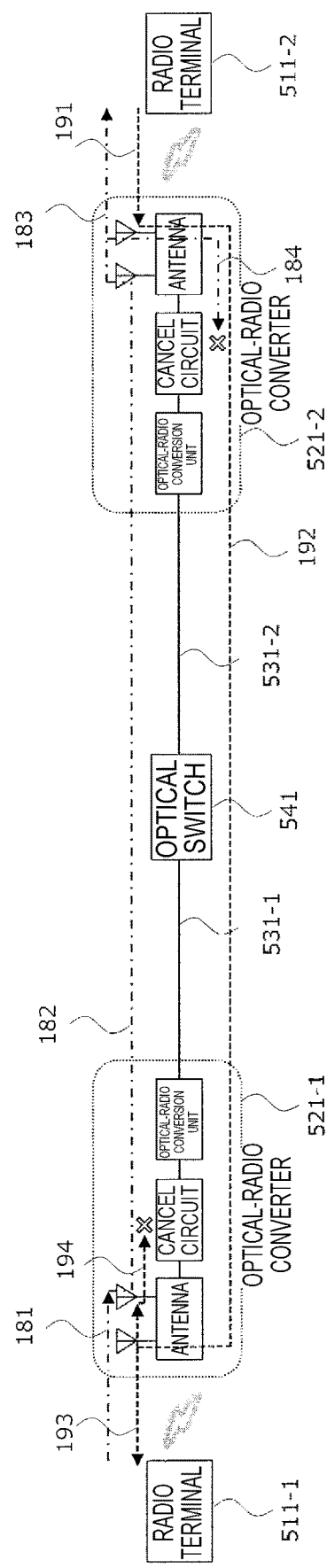
FIG. 9 shows an example of removal of a wraparound radio signal using a cancel circuit.

FIG. 9 shows propagation and transmission of a signal in the communication network system shown in FIG. 7. For ease of understanding, a part of the configuration and reference numerals shown in FIG. 7 are omitted in FIG. 9.

A radio signal 181 transmitted from the radio terminal 511-1 is converted into an optical fiber radio signal 182 in the optical-radio converter 521-1, and transmitted in the optical fiber transmission lines 531-1 and 531-2. The optical fiber radio signal 182 is converted into a radio signal 183 in the optical-radio converter 521-2, and transmitted to the radio terminal 511-2. At this time, in the optical-radio converter 521-2, the radio signal 183 is received by the reception antenna 552 to become a wraparound radio signal 184, and propagated to the cancel circuit 571. The wraparound radio signal 184 is removed in the cancel circuit 571 using the radio signal 183.

On the other hand, a radio signal 191 transmitted from the radio terminal 511-2 is converted into an optical fiber radio signal 192 in the optical-radio converter 521-2, and transmitted in the optical fiber transmission lines 531-2 and 531-1. The optical fiber radio signal 192 is converted into a radio signal 193 in the optical-radio converter 521-1, and transmitted to the radio terminal 511-1. At this time, in the optical-radio converter 521-1, the radio signal 193 is received by the reception antenna 552 to become a wraparound radio signal 194, and propagated to the cancel circuit 571. The cancel circuit 571 removes the wraparound radio signal 194 using the radio signal 193.

In this way, the wraparound radio signal that is generated when the optical fiber radio signal 591-2 is converted by the optical-radio converter 521-2 into a radio signal and transmitted to the radio terminal 511-2 is removed in the cancel circuit 571 provided in the optical-radio converter 521-2. Further, the wraparound radio signal that is generated when the optical fiber radio signal 591-1 is converted by the optical-radio converter 521-1 into a radio signal and transmitted to the radio terminal 511-1 is removed in the cancel circuit 571 provided in the optical-radio converter 521-1. The same applies to the other optical-radio converters 521-3 to 521-n.

Figure 10:
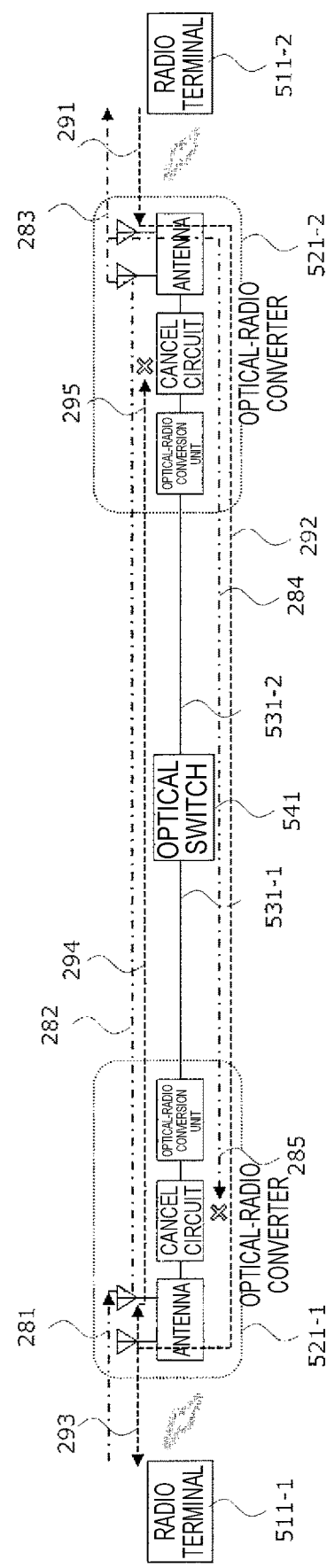
FIG. 10 shows an example of removal of a wraparound optical fiber radio signal using the cancel circuit.

FIG. 10 shows propagation and transmission of a signal in the communication network system shown in FIG. 7. For ease of understanding, a part of the configuration and reference numerals shown in FIG. 7 are omitted in FIG. 10.

A radio signal 281 transmitted from the radio terminal 511-1 is converted into an optical fiber radio signal 282 in the optical-radio converter 521-1, and transmitted in the optical fiber transmission lines 531-1 and 531-2. The optical fiber radio signal 282 is converted into a radio signal 283 in the optical-radio converter 521-2, and transmitted to the radio terminal 511-2. At this time, in the optical-radio converter 521-2, the radio signal 283 is received by the reception antenna 552, converted by the optical-radio conversion unit 581 into a wraparound optical fiber radio signal 284, and transmitted in the optical fiber transmission lines 531-2 and 531-1. The wraparound optical fiber radio signal 284 is converted by the optical-radio conversion unit 561 in the optical-radio converter 521-1 into a wraparound radio signal 285, and propagated to the cancel circuit 571. The wraparound radio signal 285 is removed in the cancel circuit 571 using the radio signal 281.

A radio signal 291 transmitted from the radio terminal 511-2 is converted into an optical fiber radio signal 292 in the optical-radio converter 521-2, and transmitted in the optical fiber transmission lines 531-2 and 531-1. The optical fiber radio signal 292 is converted into a radio signal 293 in the optical-radio converter 521-1, and transmitted to the radio terminal 511-1. At this time, in the optical-radio converter 521-1, the radio signal 293 is received by the reception antenna 552, converted by the optical-radio conversion unit 581 into a wraparound optical fiber radio signal 294, and transmitted in the optical fiber transmission lines 531-1 and 531-2. The wraparound optical fiber radio signal 294 is converted by the optical-radio conversion unit 581 in the optical-radio converter 521-2 into a wraparound radio signal 295, and propagated to the cancel circuit 571. The wraparound radio signal 295 is removed in the cancel circuit 571 using the radio signal 291.

In this way, in this embodiment, the wraparound optical fiber radio signal that is generated when the optical fiber radio signal 591-2 is converted by the optical-radio converter 521-2 into a radio signal and transmitted to the radio terminal 511-2 is removed in the cancel circuit 571 provided in the optical-radio converter 521-1. Further, the wraparound optical fiber radio signal that is generated when the optical fiber radio signal 591-1 is converted by the optical-radio converter 521-1 into a radio signal and transmitted to the radio terminal 511-1 is removed in the cancel circuit 571 provided in the optical-radio converter 521-2. The same applies to the other optical-radio converters 521-3 to 521-n.

Figure 11:
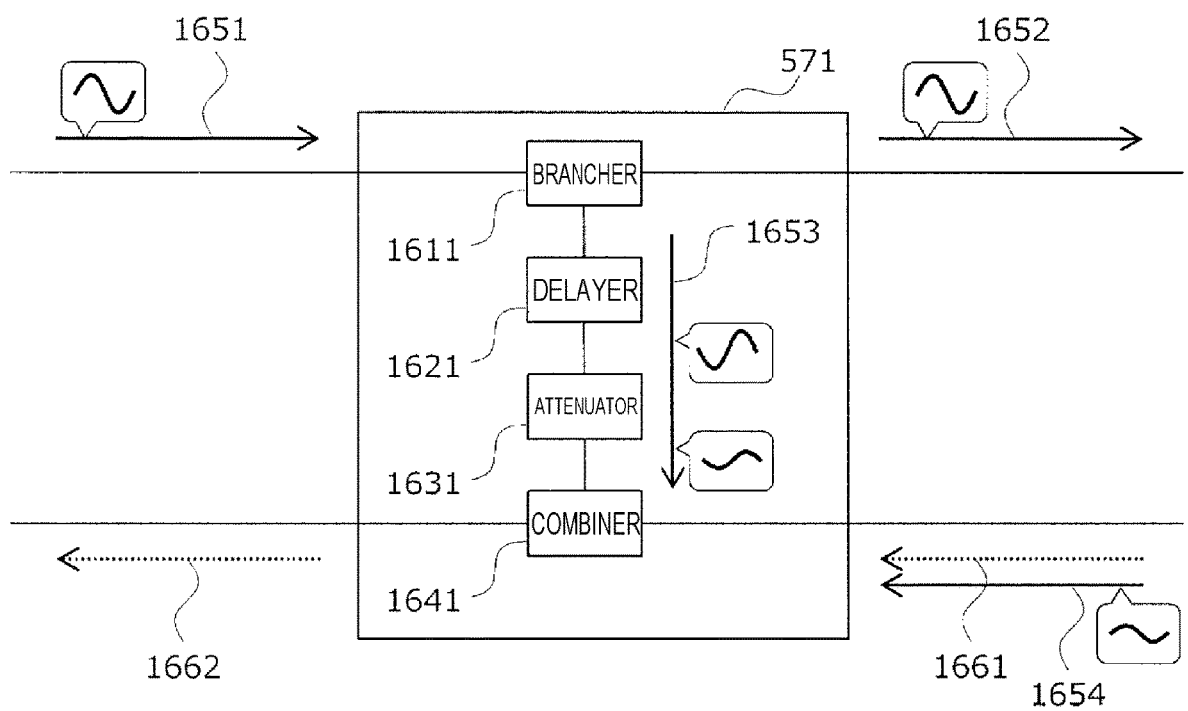
FIG. 11 shows an example configuration of the cancel circuit.

The cancel circuit 571 can be configured, for example, as in FIG. 11. The cancel circuit shown in FIG. 11 includes a brancher 1611, a delayer 1621, an attenuator 1631, and a combiner 1641. Radio signals 1651, 1661 and a wraparound radio signal 1654 of the radio signal 1651 are input to the cancel circuit 571, and radio signals 1652, 1662 are output from the cancel circuit 571.

The radio signal 1651 input to the cancel circuit 571 is branched into radio signals 1652, 1653 by the brancher 1611, and the radio signal 1652 is output from the cancel circuit 571. The radio signal 1653 is given a desired delay and attenuation so as to be a signal opposite in phase to the wraparound radio signal 1654 in the delayer 1621 and the attenuator 1631 to become a suppression signal. The radio signal 1653 that has become the suppression signal is combined by the combiner 1641 with the radio signal 1661 and the wraparound radio signal 1654 input to the cancel circuit 571. Since the radio signal 1653 and the wraparound radio signal 1654 are controlled to have the relationship of the same intensity and opposite phases by the delayer 1621 and the attenuator 631, they cancel each other when combined by the combiner 1641, so that the radio signal 1661 is output as it is as the radio signal 1662.

The radio signal 1651 and the wraparound radio signal 1654 are, for example, the radio signal 183 and the wraparound radio signal 184 shown in FIG. 9. The radio signal 1651 and the wraparound radio signal 1654 are, for example, the radio signal 281 and the wraparound radio signal 285 shown in FIG. 10.

Note that the method of generating the suppression signal is not limited to the method using the delayer and the attenuator, and any method can be employed that can generate a signal equal in intensity and opposite in phase to the wraparound radio signal 1654 using the radio signal 1653. Further, the signal intensity of the suppression signal is not limited to be equal to the wraparound radio signal 1654, and may be any intensity that can suppress the wraparound radio signal 1654.

Further, although this embodiment shows an example in which the cancel circuit 571 suppresses both the wraparound radio signal and the wraparound optical fiber radio signal, the present disclosure is not limited thereto. For example, the cancel circuit 571 has a function to suppress at least either the wraparound radio signal or the wraparound optical fiber radio signal. Further, in the present disclosure, a cancel circuit that suppresses the wraparound radio signal and a cancel circuit that suppresses the wraparound optical fiber radio signal may be provided as separate functional units.

Figure 5:
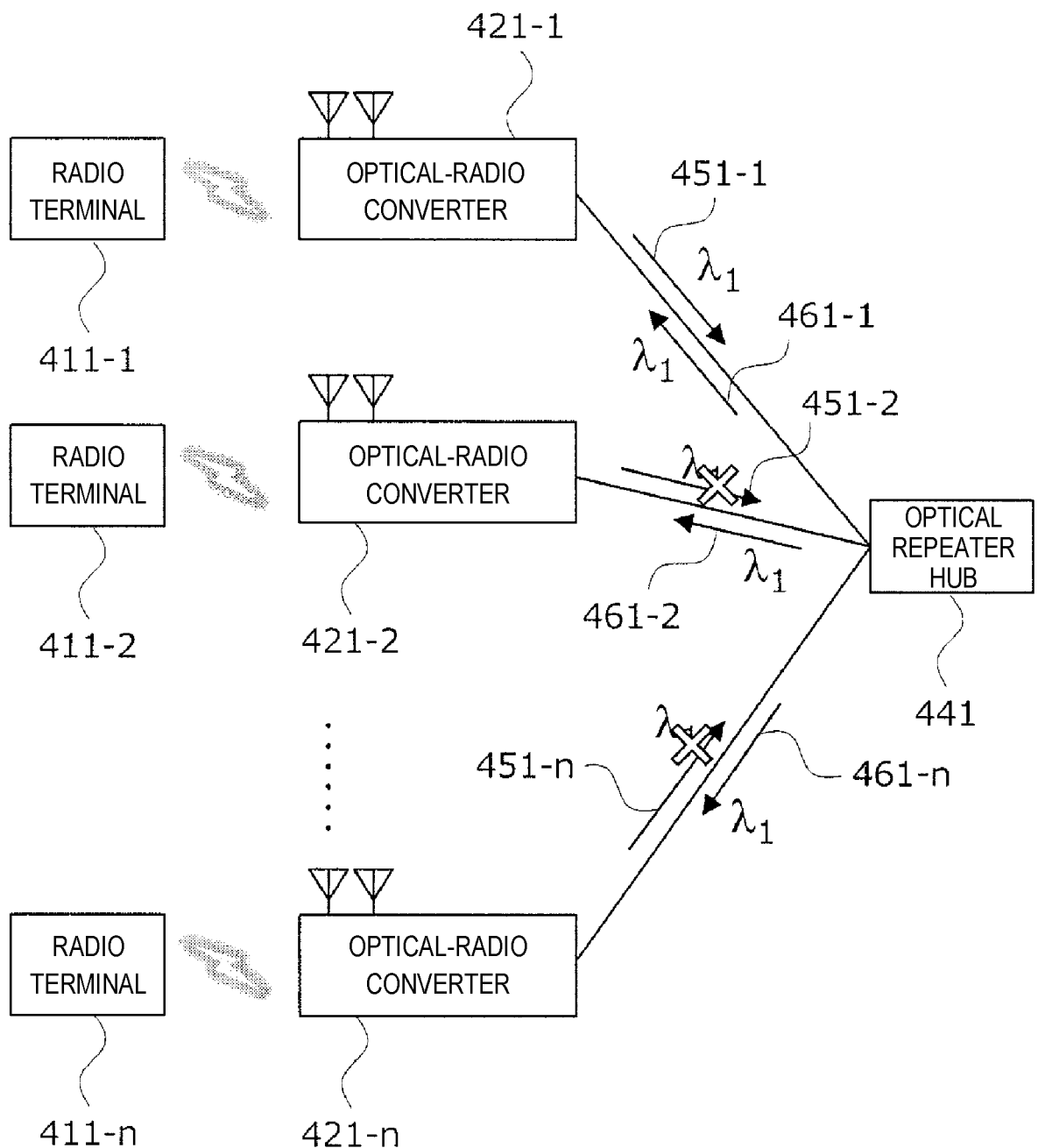
FIG. 5 shows an example of a signal in the communication network system shown in FIG. 4.
Figure 6:
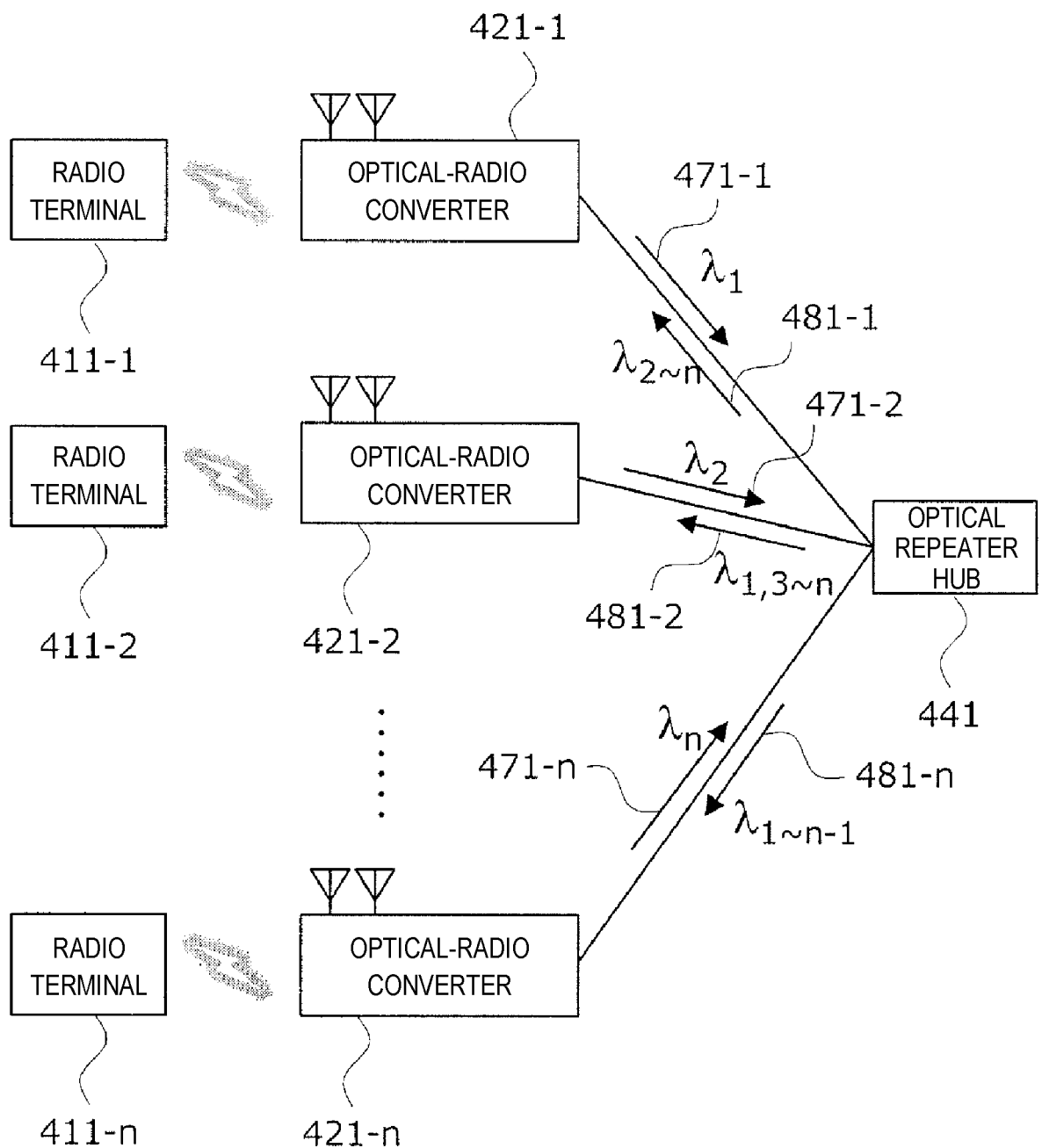
FIG. 6 shows another example of a signal in the communication network system shown in FIG. 4.

The communication network system shown in FIG. 7 as described above can resolve a problem that since an optical fiber radio signal is transmitted to each of the optical-radio converters, communication efficiency significantly decreases due to time division multiplexing as shown in FIG. 5, or the configuration and management of the optical-radio converters become complex due to wavelength division multiplexing as shown in FIG. 6.

Further, it becomes possible to remove unnecessary radio signals using the cancel circuit 571, and thereby degradation in signal quality is avoided, so that it is possible to obtain effects such as a decrease in the radio propagation range or a decrease in the transmission band. Furthermore, since it becomes possible to transmit/receive radio signals simultaneously as a secondary effect of the cancel circuit 571, it also becomes possible to extend radio communication in which half-duplex communication is performed using time division multiplexing in general to full-duplex communication.

Further, since conduction routes are controlled by the optical switch in this embodiment, it becomes possible to perform conduction route control that is lower in delay than in performing electrical processing and does not depend on the type of the radio signal. Accordingly, this embodiment is effective when applied to communication networks having strict delay requirements, or to communication networks that accommodate a wide variety of radio signals.

Note that in such a form as in FIG. 7 as well, it may be combined with time division multiplexing or wavelength division multiplexing to increase the number of connected radio terminals and optical-radio converters. Further, in order to avoid the influence of degradation of a received signal due to reflected light that is caused by performing bidirectional communication using the same wavelength on an optical fiber transmission line, the optical fiber transmission line may be composed of two or more cores, or optical fiber radio signals in the opposite directions may be set to have different wavelengths.

Second Embodiment

Figure 12:
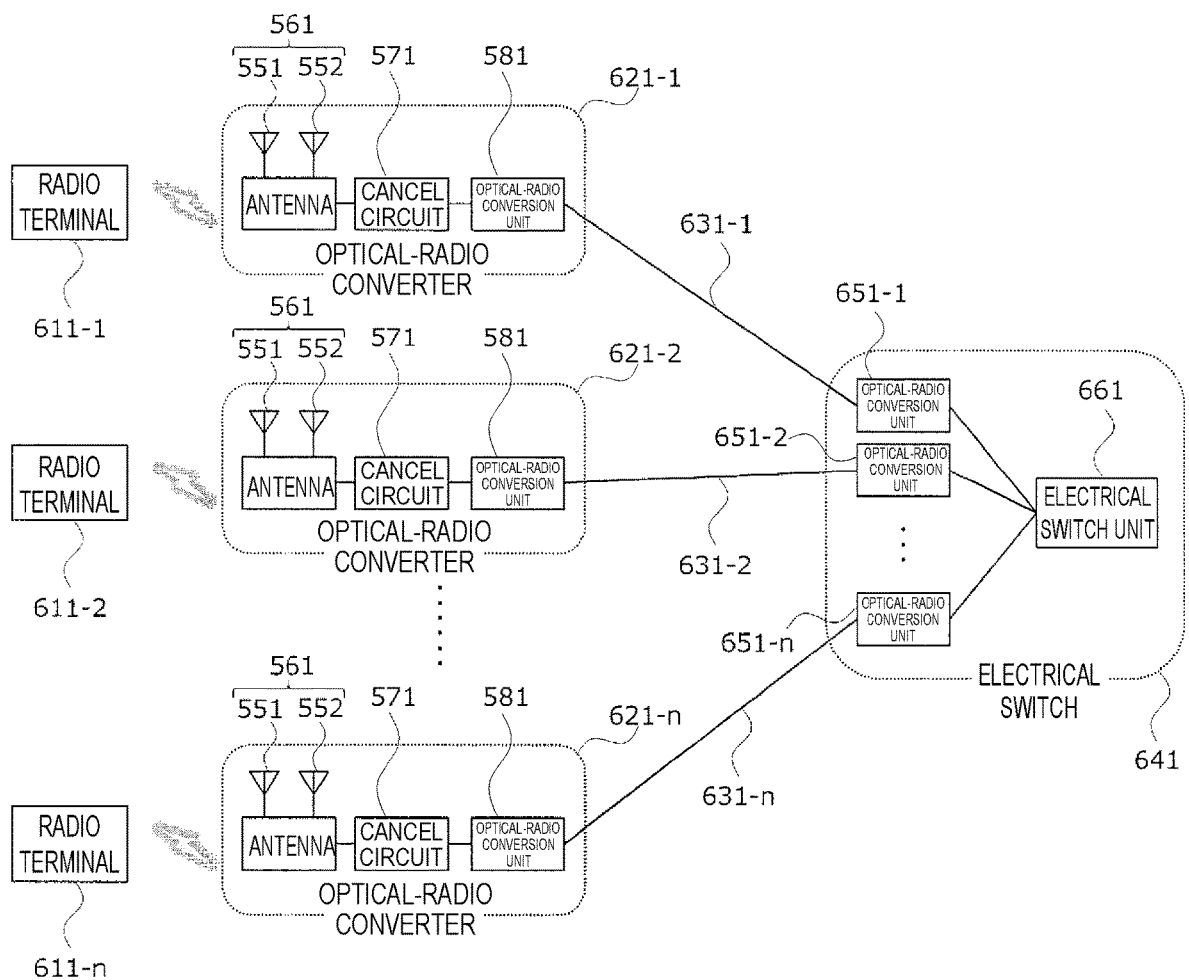
FIG. 12 shows an example of a communication network system according to a second embodiment.

FIG. 12 is a diagram showing a second example of a communication network system in the present disclosure.

The communication network system shown in FIG. 12 includes a plurality of radio terminals 611-1, 611-2 to 611-$n$, a plurality of optical-radio converters 621-1, 621-2 to 621-$n$, a plurality of optical fiber transmission lines 631-1, 631-2 to 631-$n$, and an electrical switch 641 that functions as a path controller. The electrical switch 641 includes a plurality of optical-radio conversion units 651-1, 651-2 to 651-$n$, and an electrical switch unit 661. Here, n is any integer of 2 or more.

The optical-radio converters 621-1, 621-2 to 621-$n$ include the antenna unit 561 including the transmission antenna 551 and the reception antenna 552, the cancel circuit 571, and the optical-radio conversion unit 581, and are configured to be connected to the electrical switch unit 661 through the optical fiber transmission lines 631-1, 631-2 to 631-$n$, respectively. The electrical switch unit 661 is connected to the optical fiber transmission lines 631-1, 631-2 to 631-$n$ via the optical-radio conversion units 651-1, 651-2 to 651-$n$. The functions and operations of the antenna unit 561, the cancel circuit 571, and the optical-radio conversion unit 581 are as described in the first embodiment.

The electrical switch unit 661 controls conduction routes for optical fiber radio signals. For example, when the optical-radio converter 621-1 transmits an optical fiber radio signal to the optical-radio converter 621-2, the electrical switch unit 661 performs control so that the optical-radio conversion unit 651-1 and the optical-radio conversion unit 651-2 are conductive with each other. Thereby, in this embodiment, it is possible to transmit the optical fiber radio signal only to the desired optical-radio converter 621-2 without transmitting unnecessary optical fiber radio signals to the other optical-radio converters.

Figure 13:
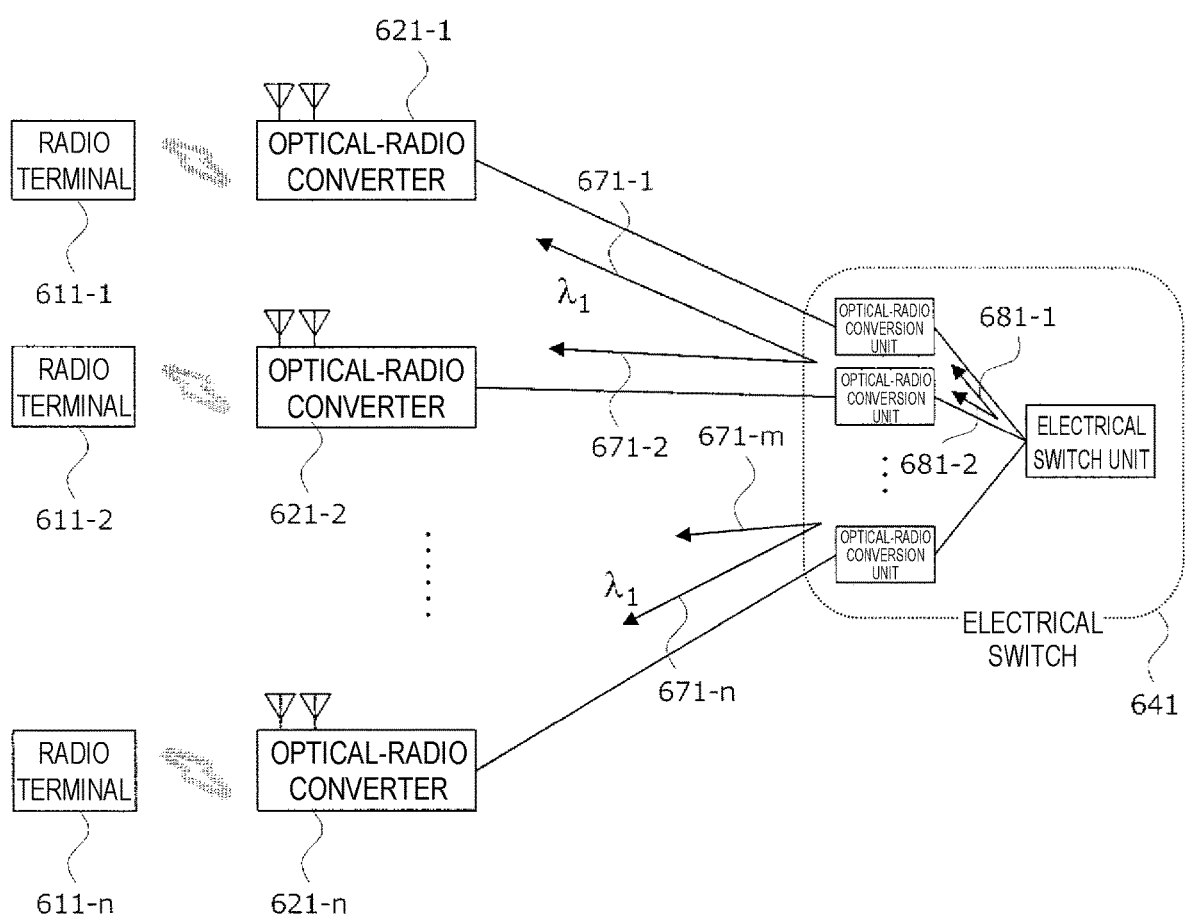
FIG. 13 shows an example of a signal in the communication network system shown in FIG. 12.

FIG. 13 is a diagram showing an example of communication route control by the electrical switch in the communication network system shown in FIG. 12. For ease of understanding, a part of the configuration and reference numerals shown in FIG. 12 are omitted in FIG. 13. A radio signal transmitted from the radio terminal 611-1 is converted by the optical-radio converter 621-1 into an optical fiber radio signal 671-1 having the optical wavelength $\lambda_1$, and transmitted to the electrical switch 641 through the optical fiber transmission line 631-1. The electrical switch 641 uses the optical-radio conversion unit 651-1 therein to convert the optical fiber radio signal 671-1 into a radio signal 681-1, and transmits it to the electrical switch unit 661. The electrical switch unit 661 controls the destination of the radio signal 681-1 to transmit it to the optical-radio conversion unit 651-2 as a radio signal 681-2. The optical-radio conversion unit 651-2 converts the radio signal 681-2 into an optical fiber radio signal 671-2, and transmits it to the optical-radio converter 621-2 through the optical fiber transmission line 631-2. Further, a radio signal transmitted from the radio terminal 611-2 is converted by the optical-radio converter 621-2 into the optical fiber radio signal 671-2 having the optical wavelength $\lambda_1$, and transmitted to the electrical switch 641 through the optical fiber transmission line 631-2. The electrical switch 641 uses the optical-radio conversion unit 651-2 therein to convert the optical fiber radio signal 671-2 into the radio signal 681-2, and transmits it to the electrical switch unit 661. The electrical switch unit 661 controls the destination of the radio signal 681-2 to transmit it to the optical-radio conversion unit 651-1 as the radio signal 681-1. The optical-radio conversion unit 651-1 converts the radio signal 681-1 into the optical fiber radio signal 671-1, and transmits it to the optical-radio converter 621-1 through the optical fiber transmission line 631-1. Thereby, communication is established between the radio terminal 611-1 and the radio terminal 611-2.

As the electrical switch unit 661, any device can be used that can output the radio signal 681-1 to the optical-radio conversion unit 651-2 determined by the optical fiber transmission line 631-2 as the output destination. For example, as the electrical switch unit 661, an electrical switch having n×n ports can be used in which the optical fiber transmission lines 631-1 to 631-$n$ are connected to the input ports and the optical fiber transmission lines 631-1 to 631-$n$ are connected to the output ports. Output ports corresponding to input ports are set at any timing before transmitting the optical fiber radio signals 671-1, 671-2. Note that the method of controlling conduction routes is optional, and can be configured by using an electrical splitter, a frequency converter, an electrical route switcher, or the like, alone or in combination of two or more thereof.

For example, a radio signal transmitted from the radio terminal 611-$n$ is converted by the optical-radio converter 621-$n$ into an optical fiber radio signal 671-$n$ having the optical wavelength $\lambda_1$, and transmitted to the electrical switch 641 through the optical fiber transmission line 631-$n$, although the same applies to radio signals transmitted from the other radio terminals. The electrical switch 641 uses the optical-radio conversion unit 651-$n$ and the electrical switch unit 661 therein to control the destination of the optical fiber radio signal 671-$n$, and transmits it to another optical-radio converter through another optical fiber transmission line as an optical fiber radio signal 671-$m$. Here, m is any integer from 1 to n.

In this way, in this embodiment, the electrical switch 641 is used to control conduction routes for optical fiber radio signals, thereby enabling only freely-selected optical-radio converters to transmit/receive optical fiber radio signals to/from each other.

Further, in this embodiment, the optical-radio converters 621-1 to 621-$n$ include the cancel circuit 571 that functions as a wraparound signal suppression circuit. For this reason, the wraparound radio signal that is generated when the optical fiber radio signal 671-2 is converted by the optical-radio converter 621-2 into a radio signal and transmitted to the radio terminal 611-2 is removed in the cancel circuit 571 provided in the optical-radio converter 621-2. Further, the wraparound radio signal that is generated when the optical fiber radio signal 671-1 is converted by the optical-radio converter 621-1 into a radio signal and transmitted to the radio terminal 611-1 is removed in the cancel circuit 571 provided in the optical-radio converter 621-1. The same applies to the other optical-radio converters 621-3 to 621-$n$.

Further, in this embodiment, the wraparound optical fiber radio signal that is generated when the optical fiber radio signal 671-2 is converted by the optical-radio converter 621-2 into a radio signal and transmitted to the radio terminal 611-2 is removed in the cancel circuit 571 provided in the optical-radio converter 621-1. Further, the wraparound optical fiber radio signal that is generated when the optical fiber radio signal 671-1 is converted by the optical-radio converter 621-1 into a radio signal and transmitted to the radio terminal 611-1 is removed in the cancel circuit 571 provided in the optical-radio converter 621-2. The same applies to the other optical-radio converters 621-3 to 621-$n$.

Figure 4:
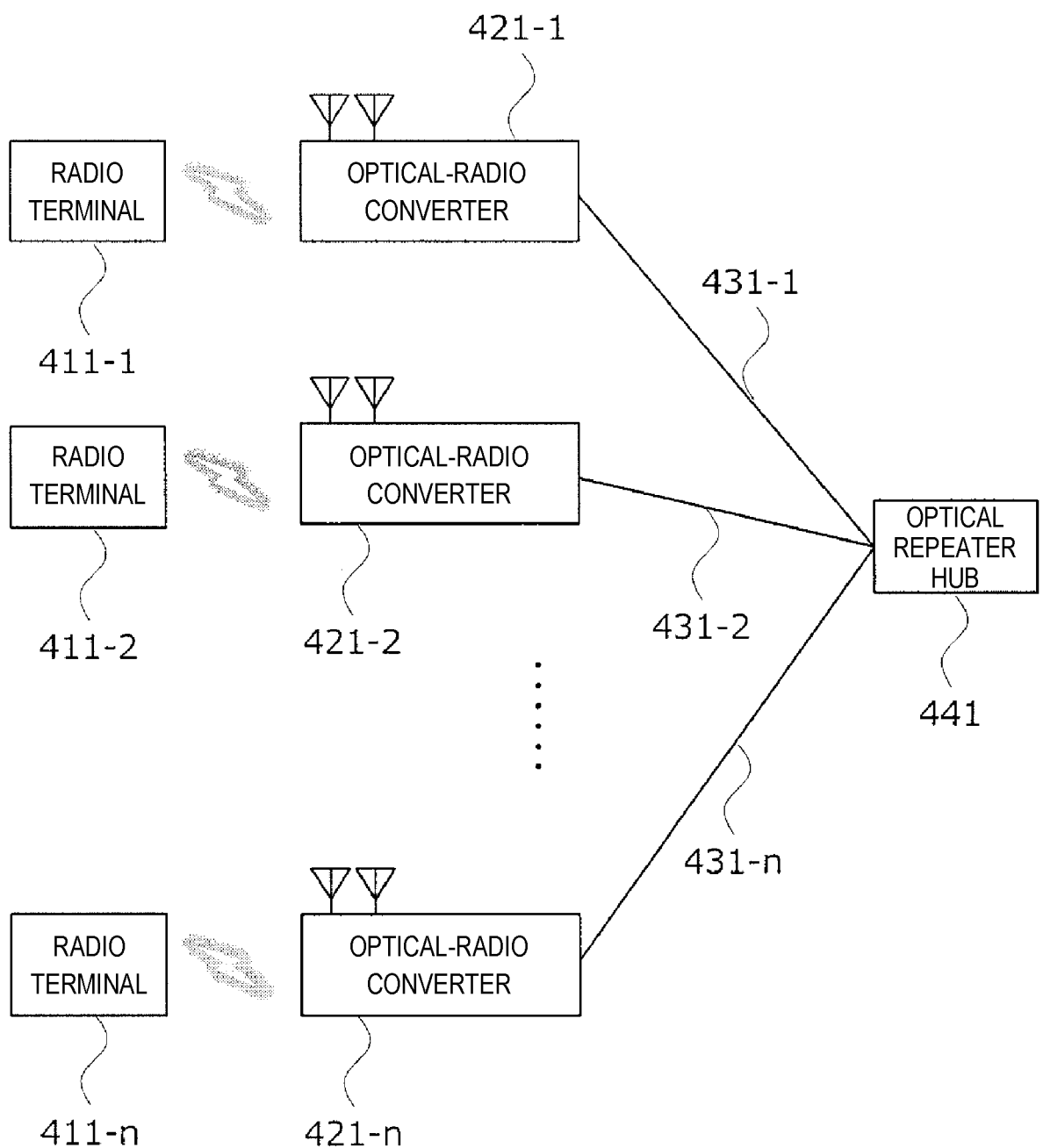
FIG. 4 shows a fourth example of a communication network system related to the present disclosure.

The communication network system shown in FIG. 12 as described above can resolve a problem that since an optical fiber radio signal is transmitted to all the optical-radio converters as shown in FIG. 4, communication efficiency significantly decreases due to time division multiplexing, or the configuration and management of the optical-radio converters become complex due to wavelength division multiplexing.

Further, it becomes possible to remove unnecessary radio signals using the cancel circuit 571, and thereby degradation in signal quality is avoided, so that it is possible to obtain effects such as a decrease in the radio propagation range or a decrease in the transmission band. Furthermore, since it becomes possible to transmit/receive radio signals simultaneously as a secondary effect of the cancel circuit 571, it also becomes possible to extend radio communication in which half-duplex communication is performed using time division multiplexing in general to full-duplex communication.

Further, since conduction routes are controlled by the electrical switch in this embodiment, any electrical circuit can be used to process radio signals. For example, since conduction routes can be controlled in units of frequencies of radio signals, it is effective when applied to communication networks that require finer control than optical processing such as changing the frequency channel of a radio signal, or changing the optical wavelength of an optical fiber radio signal.

Note that in such a form as in FIG. 12 as well, it may be combined with time division multiplexing or wavelength division multiplexing to increase the number of connected radio terminals and optical-radio converters. Further, in order to avoid the influence of degradation of a received signal due to reflected light that is caused by performing bidirectional communication using the same wavelength on an optical fiber transmission line, it is also possible to compose the optical fiber transmission line using two or more cores, or to set different wavelengths to optical fiber radio signals in both directions.

Third Embodiment

Figure 14:
FIG. 14 shows an example of a communication network system according to a third embodiment.

FIG. 14 is a diagram showing a third example of a communication network system in the present disclosure.

The communication network system shown in FIG. 14 includes a plurality of radio terminals 711-1 to 711-$q$ including radio terminals 711-1, 711-$m$, 711-$m$+1, 711-$n$, 711-$p$, a plurality of optical-radio converters 721-1 to 721-$q$ including optical-radio converters 721-1 to 721-$m$, 721-$m$+1 to 721-$n$, 721-$p$ to 721-$q$, a plurality of optical fiber transmission lines 731-1 to 731-$q$ and 751-1 to 751-$x$ including optical fiber transmission lines 731-1 to 731-$m$, 731-$m$+1 to 731-$n$, 731-$p$ to 731-$q$, and optical switches 741-1, 741-2 to 741-$x$ and 761.

Figure 3:
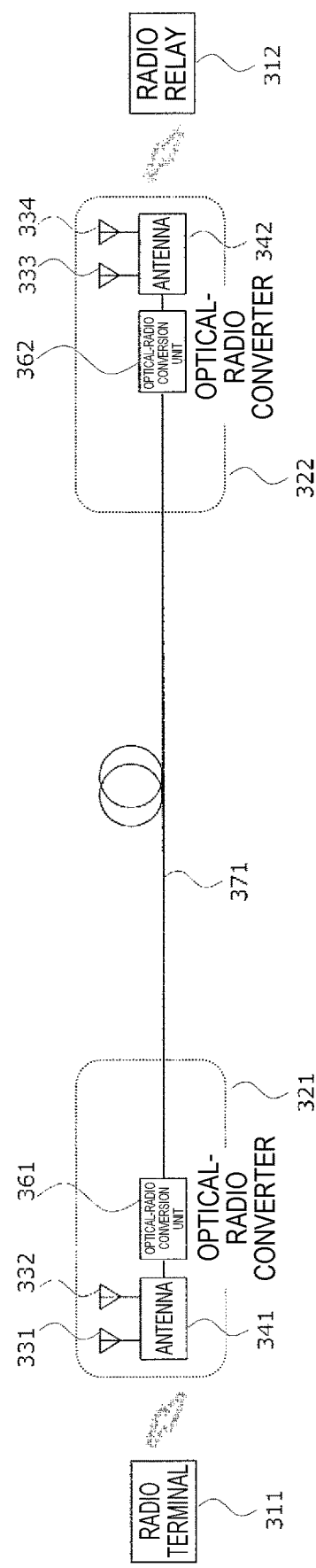
FIG. 3 shows a third example of a communication network system related to the present disclosure.

The optical-radio converters 721-1 to 721-$q$ have the same configuration as that of the optical-radio converter 321 shown in FIG. 3, and are configured to be connected to the optical switches 741-1 to 741-$x$ through the optical fiber transmission lines 731-1 to 731-$q$, respectively. The optical switches 741-1 to 741-$x$ and 761 have the same configuration as that of the optical switch 541 shown in FIG. 7, and the optical switches 741-1 to 741-$x$ are configured to be connected to the optical switch 761 through the optical fiber transmission lines 751-1 to 751-$x$, respectively.

The communication network system shown in FIG. 14 as described above enables the communication network system shown in FIG. 7 to be connected in a broader range. In this embodiment, the optical switch 761 outputs an optical fiber radio signal from the optical switches 741-1 to 741-$x$ to a set path between the optical fiber transmission line 751-1 and the optical fiber transmission line 751-$x$.

Note that although FIG. 14 shows an example of connecting optical switches in two stages, a form of connecting three or more stages is also possible. Further, a form in which various numbers of stages are mixedly present is also possible such as a form in which two-stage connection and three-stage connection are mixedly present.

Fourth Embodiment

Figure 15:
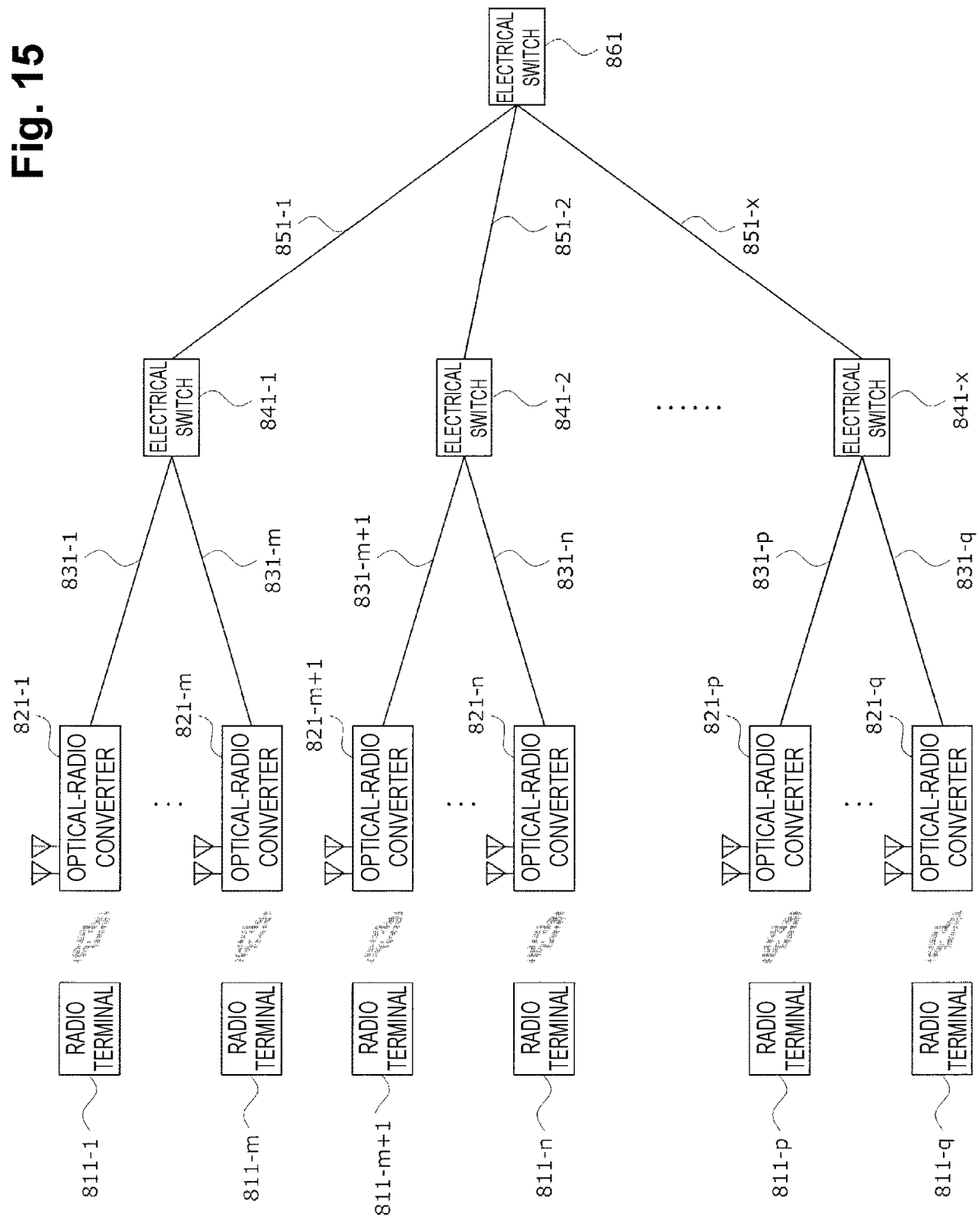
FIG. 15 shows an example of a communication network system according to a fourth embodiment.

FIG. 15 is a diagram showing a fourth example of a communication network system in the present disclosure.

The communication network system shown in FIG. 15 includes a plurality of radio terminals 811-1 to 811-$q$ including radio terminals 811-1, 811-$m$, 811-$m$+1, 811-$n$, 811-$p$, a plurality of optical-radio converters 821-1 to 821-$q$ including optical-radio converters 821-1 to 821-$m$, 821-$m$+1 to 821-$n$, 821-$p$ to 821-$q$, a plurality of optical fiber transmission lines 831-1 to 831-$q$ and 851-1 to 851-$x$ including optical fiber transmission lines 831-1 to 831-$m$, 831-$m$+1 to 831-$n$, 831-$p$ to 831-$q$, and electrical switches 841-1, 841-2 to 841-$x$ and 861.

The optical-radio converters 821-1 to 821-$q$ have the same configuration as that of the optical-radio converter 321 shown in FIG. 3, and are configured to be connected to the electrical switches 841-1 to 841-$x$ through the optical fiber transmission lines 831-1 to 831-$q$, respectively. The electrical switches 841-1 to 841-$x$ and 861 have the same configuration as that of the electrical switch 641 shown in FIG. 12, and the electrical switches 841-1 to 841-$x$ are configured to be connected to the electrical switch 861 through the optical fiber transmission lines 851-1 to 851-$x$, respectively.

The communication network system shown in FIG. 15 as described above enables the communication network system shown in FIG. 12 to be connected in a broader range. In this embodiment, the electrical switch 861 outputs a radio signal received from the electrical switches 841-1 to 841-$x$ to a preset path at any optical wavelength by changing the frequency channel as necessary.

Note that although FIG. 15 shows an example of connecting optical switches in two stages, a form of connecting three or more stages is also possible. Further, a form in which various numbers of stages are mixedly present is also possible such as a form in which two-stage connection and three-stage connection are mixedly present.

Fifth Embodiment

Figure 16:
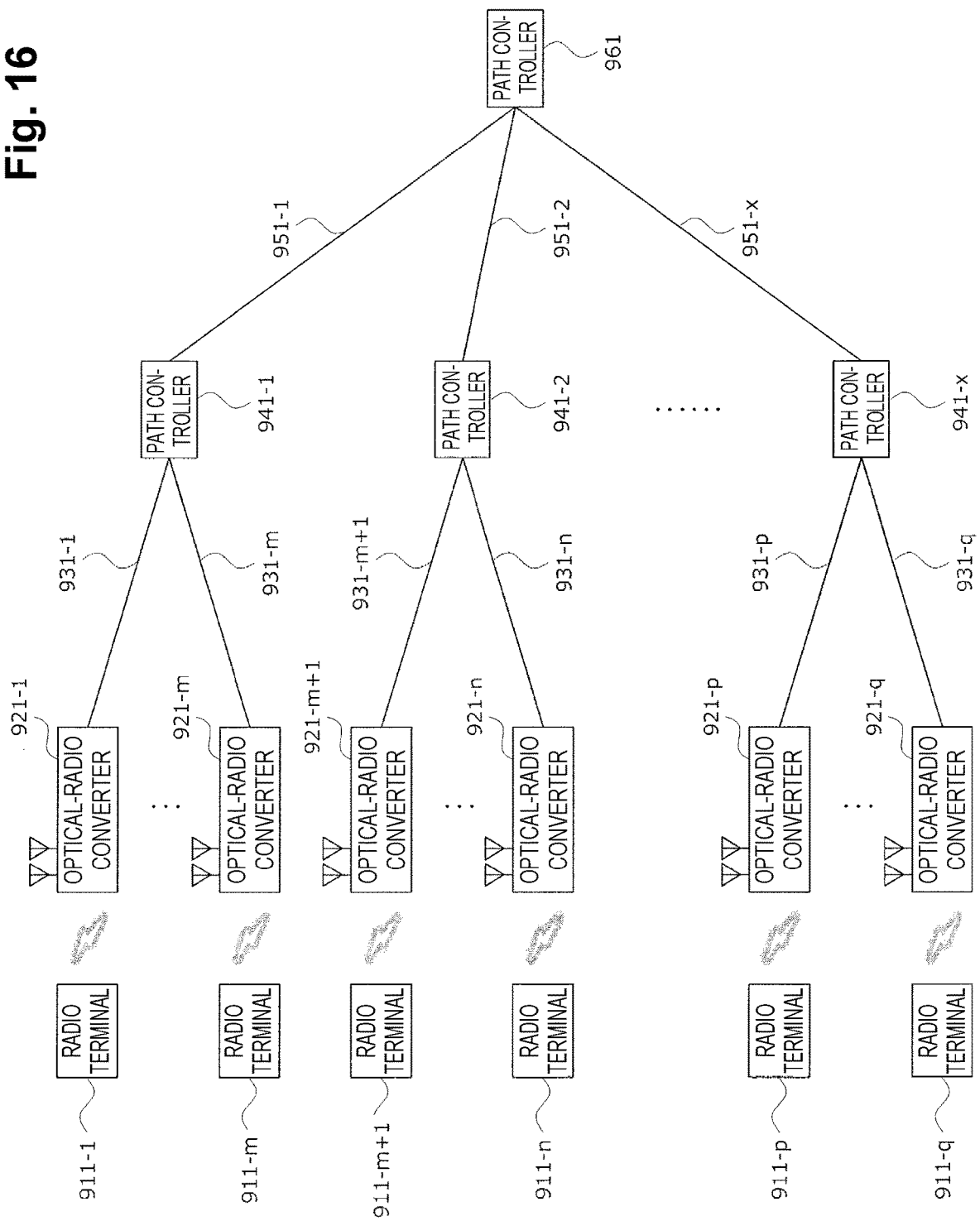
FIG. 16 shows an example of a communication network system according to a fifth embodiment.

FIG. 16 is a diagram showing a fifth example of a communication network system in the present disclosure.

The communication network system shown in FIG. 16 includes a plurality of radio terminals 911-1 to 911-$q$ including radio terminals 911-1, 911-$m$, 911-$m$+1, 911-$n$, 911-$p$, a plurality of optical-radio converters 921-1 to 921-$q$ including optical-radio converters 921-1 to 921-$m$, 921-$m$+1 to 921-$n$, 921-$p$ to 921-$q$, a plurality of optical fiber transmission lines 931-1 to 931-$q$ and 951-1 to 951-$x$ including optical fiber transmission lines 931-1 to 931-$m$, 931-$m$+1 to 931-$n$, 931-$p$ to 931-$q$, and path controllers 941-1, 941-2 to 941-$x$ and 961.

The optical-radio converters 921-1 to 921-$q$ have the same configuration as that of the optical-radio converter 321 shown in FIG. 3, and are configured to be connected to the path controllers 941-1 to 941-$x$ through the optical fiber transmission lines 931-1 to 931-$q$, respectively.

The path controllers 941-1 to 941-$x$ and 961 can individually and freely take the same configuration as that of the optical repeater hub 441 shown in FIG. 4, the same configuration as that of the optical switch 541 shown in FIG. 7, or the same configuration as that of the electrical switch 641 shown in FIG. 12. However, any of the path controllers 941-1 to 941-x and 961 has the same configuration as that of the optical switch 541 shown in FIG. 8 or the same configuration as that of the electrical switch 641 shown in FIG. 12. The path controllers 941-1 to 941-x are configured to be connected to the path controller 961 through the optical fiber transmission lines 951-1 to 951-x, respectively.

The communication network system shown in FIG. 16 as described above makes it possible to arrange optical path controllers by using optical repeater hubs, optical switches, and electrical switches for the communication network systems shown in FIG. 4 to FIG. 15 in any desired manner, for example, when requirements for delay are strict between specific sites, when a wide variety of radio signals are accommodated, and when finer control than optical processing is required, such as changing the frequency channel of a radio signal or changing the optical wavelength of an optical fiber radio signal, thereby enabling more efficient expansion to a wider range.

Note that although FIG. 16 shows an example of connecting path controllers in two stages, a form of connecting three or more stages is also possible. Further, a form in which various numbers of stages are mixedly present is also possible such as a form in which two-stage connection and three-stage connection are mixedly present.

(Examples of Communication Forms)

FIGS. 17, 18, 19, and 20 are diagrams showing examples of communication forms using the first to fifth embodiments in the present disclosure and combined forms thereof. A communication network system shown in FIG. 17 includes radio terminals 1011-1 to 1011-4, 1012-1 to 1012-4, 1013-1 to 1013-4 and 1014-1 to 1014-4, optical-radio converters 1021-1 to 1021-4, 1022-1 to 1022-4, 1023-1 to 1023-4 and 1024-1 to 1024-4, optical fiber transmission lines 1031-1 to 1031-4, 1032-1 to 1032-4, 1033-1 to 1033-4, 1034-1 to 1034-4, 1051 to 1054, 1071 and 1072, optical repeater hubs 1041 to 1044, optical switches 1061 and 1062, and an electrical switch 1081.

This embodiment includes a plurality of communication networks. For example, in this embodiment, the plurality of communication networks include a communication network in which the plurality of optical-radio converters 1021-1 to 1021-4 are connected to the optical repeater hub 1041, a communication network in which the plurality of optical-radio converters 1022-1 to 1022-4 are connected to the optical repeater hub 1042, a communication network in which the plurality of optical-radio converters 1023-1 to 1023-4 are connected to the optical repeater hub 1043, and a communication network in which the plurality of optical-radio converters 1024-1 to 1024-4 are connected to the optical repeater hub 1044.

The optical-radio converters 1021-1 to 1021-4, 1022-1 to 1022-4, 1023-1 to 1023-4 and 1024-1 to 1024-4 have the same configuration as that of the optical-radio converter 321 shown in FIG. 3. The optical-radio converters 1021-1 to 1021-4 are configured to be connected to the optical repeater hub 1041 through the optical fiber transmission lines 1031-1 to 1031-4, respectively, the optical-radio converters 1022-1 to 1022-4 are configured to be connected to the optical repeater hub 1041 through the optical fiber transmission lines 1032-1 to 1032-4, respectively, the optical-radio converters 1023-1 to 1023-4 are configured to be connected to the optical repeater hub 1043 through the optical fiber transmission lines 1033-1 to 1033-4, respectively, and the optical-radio converters 1024-1 to 1024-4 are configured to be connected to the optical repeater hub 1044 through the optical fiber transmission lines 1034-1 to 1034-4, respectively.

The optical repeater hubs 1041 to 1044 have the same configuration as that of the optical repeater hub shown in FIG. 4. For example, the optical repeater hub 1041 transmits an optical fiber radio signal transmitted from any optical-radio converter included in the plurality of optical-radio converters 1021-1 to 1021-4 to the optical-radio converters other than the transmission source of the plurality of optical-radio converters 1021-1 to 1021-4. In this embodiment, in addition to connection to the optical-radio converters 1021-1 to 1021-4, 1022-1 to 1022-4, 1023-1 to 1023-4 and 1024-1 to 1024-4 described above, they are configured to be connected to the optical switch 1061 or 1062 through the optical fiber transmission lines 1051 to 1054, respectively.

The optical switches 1061 to 1062 have the same configuration as that of the optical switch shown in FIG. 7, and are configured to be connected not only to the optical repeater hubs 1041 to 1044 described above, but also to the electrical switch 1081 through the optical fiber transmission line 1071 or 1072, respectively. The electrical switch 1081 has the same configuration as that of the electrical switch shown in FIG. 12.

The optical-radio converters 1021-1 to 1021-4, 1022-1 to 1022-4, 1023-1 to 1023-4 and 1024-1 to 1024-4 transmit, to the optical repeater hubs 1041 to 1044 connected to their respective upper sides, optical fiber radio signals 10101-1 to 10101-4, 10102-1 to 10102-4, 10103-1 to 10103-4 and 10104-1 to 10104-4, respectively. The optical repeater hubs 1041 to 1044 transmit, to the optical-radio converters 1021-1 to 1021-4, 1022-1 to 1022-4, 1023-1 to 1023-4 and 1024-1 to 1024-4 connected to their respective lower sides, optical fiber radio signals 10111-1 to 10111-4, 10112-1 to 10112-4, 10113-1 to 10113-4 and 10114-1 to 10114-4, respectively, and transmit, to the optical switch 1061 or 1062 connected to their respective upper sides, optical fiber radio signals 10121 to 10124, respectively. The optical switches 1061, 1062 transmit, to the optical repeater hubs 1041 to 1044 connected to their respective lower sides, optical fiber radio signals 10131 to 10134, respectively, and transmit, to the electrical switch 1081 connected to their upper sides, optical fiber radio signals 10141, 10142, respectively. The electrical switch 1081 transmits, to the optical switches 1061, 1062 connected to the lower side, optical fiber radio signals 10151, 10152, respectively.

Figure 17:
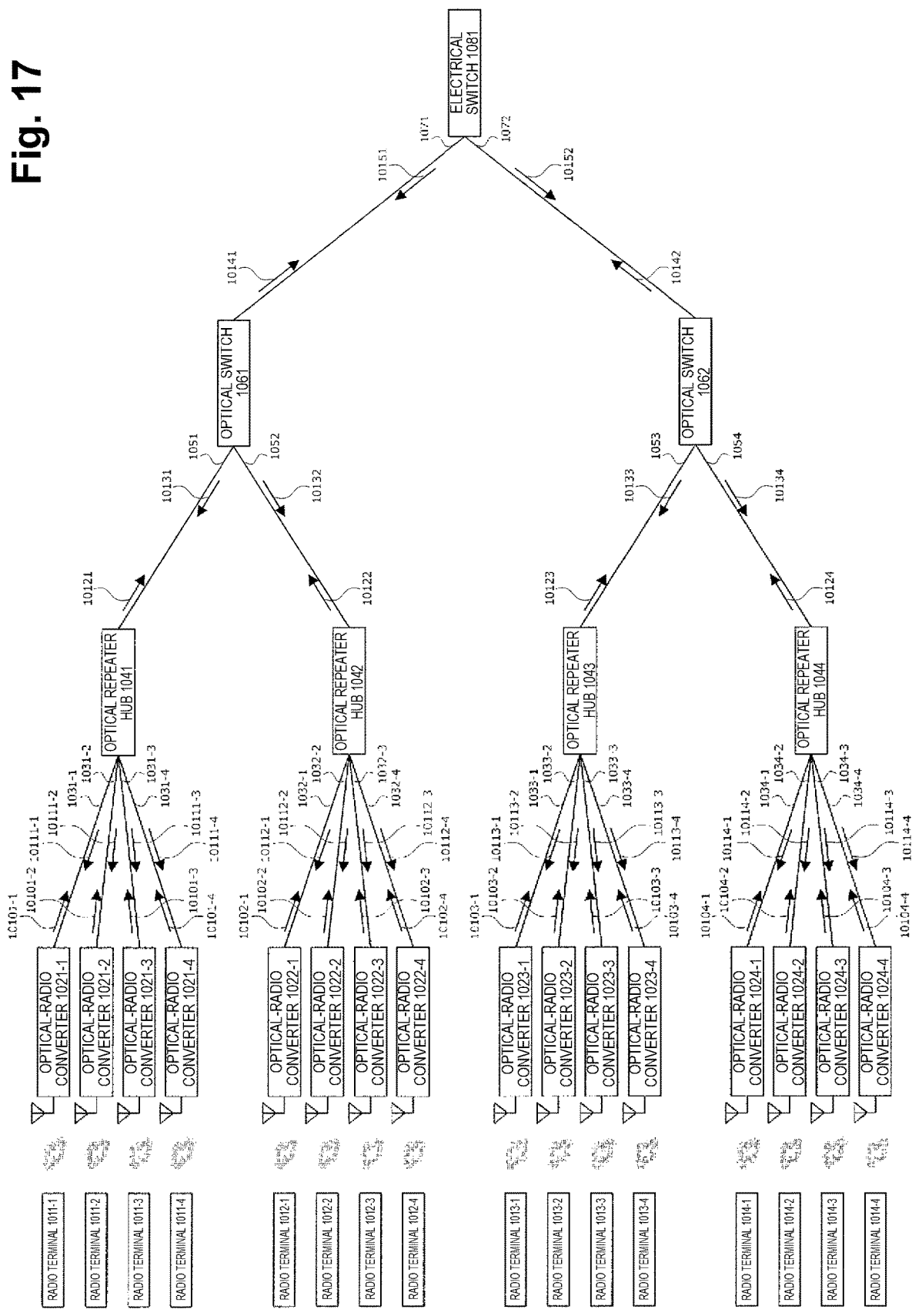
FIG. 17 shows a first example of a communication form of the present disclosure.
Figure 18:
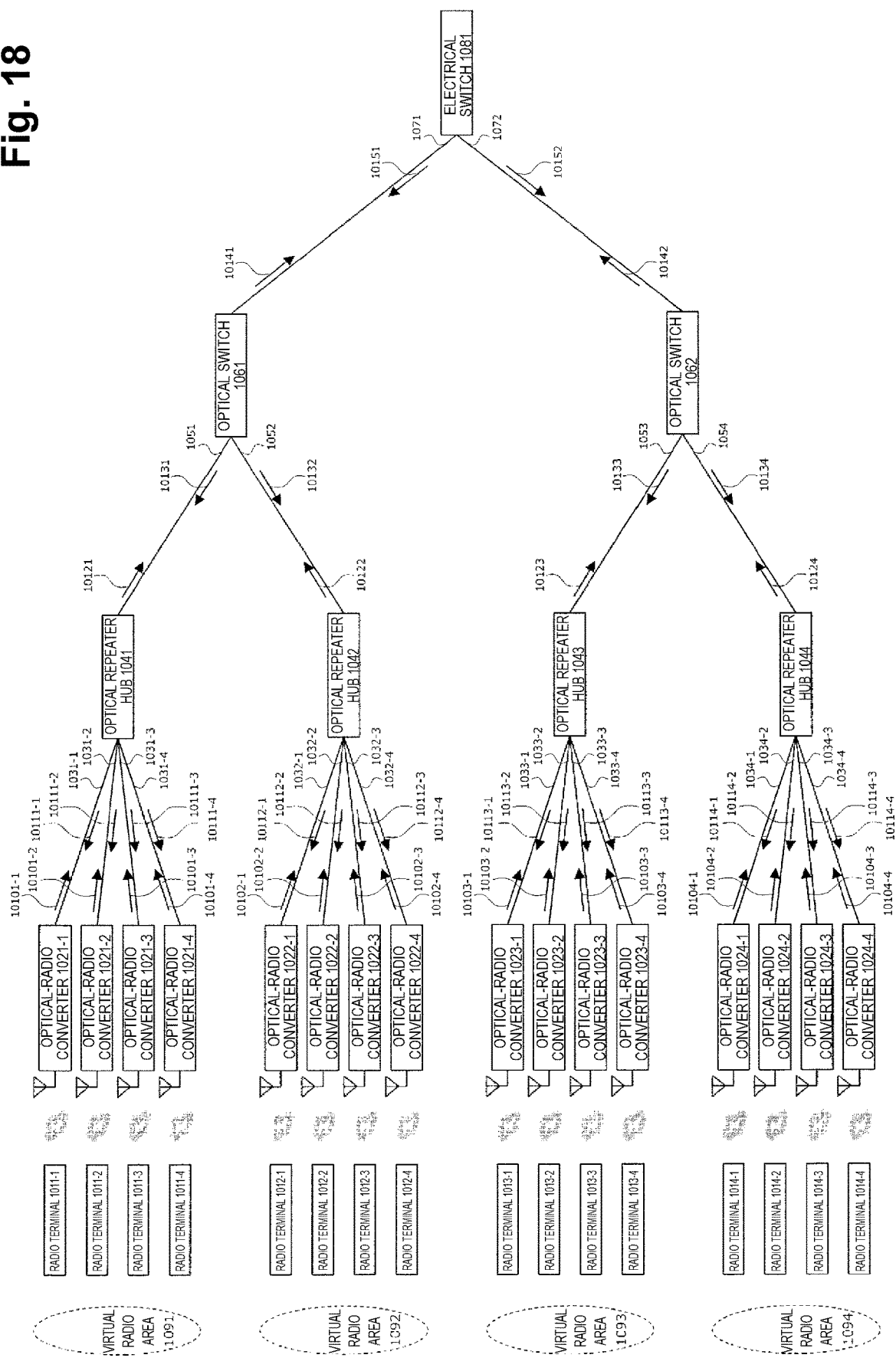
FIG. 18 shows an example of establishment of radio communication out of the radio propagation distance range in the communication network system shown in FIG. 17.

FIG. 18 is a diagram showing an example of establishment of radio communication out of the radio propagation distance range in the communication network system shown in FIG. 17. The radio terminals 1011-1 to 1011-4 uses the optical-radio converters 1021-1 to 1021-4, the optical fiber transmission lines 1031-1 to 1031-4, and the optical repeater hub 1041, thereby enabling a plurality of radio terminals out of the radio propagation distance range of each other to simultaneously establish communication between many freely-selected radio terminals as in FIG. 4. The communication range established at this time is represented as a virtual radio area 1091 in FIG. 18. Similarly for the radio terminals 1012-1 to 1012-4, 1013-1 to 1013-4 and 1014-1 to 1014-4, communication can be established as virtual radio areas 1092, 1093, 1094, respectively. At this time, since a configuration is employed in which the optical repeater hubs 1041 to 1044 are connected using the optical switches 1061 to 1062 and the electrical switch 1081, it is possible to connect the virtual radio areas 1091 to 1094 in any manner by controlling their paths, thereby establishing connection between radio terminals in a broader range.

Figure 19:
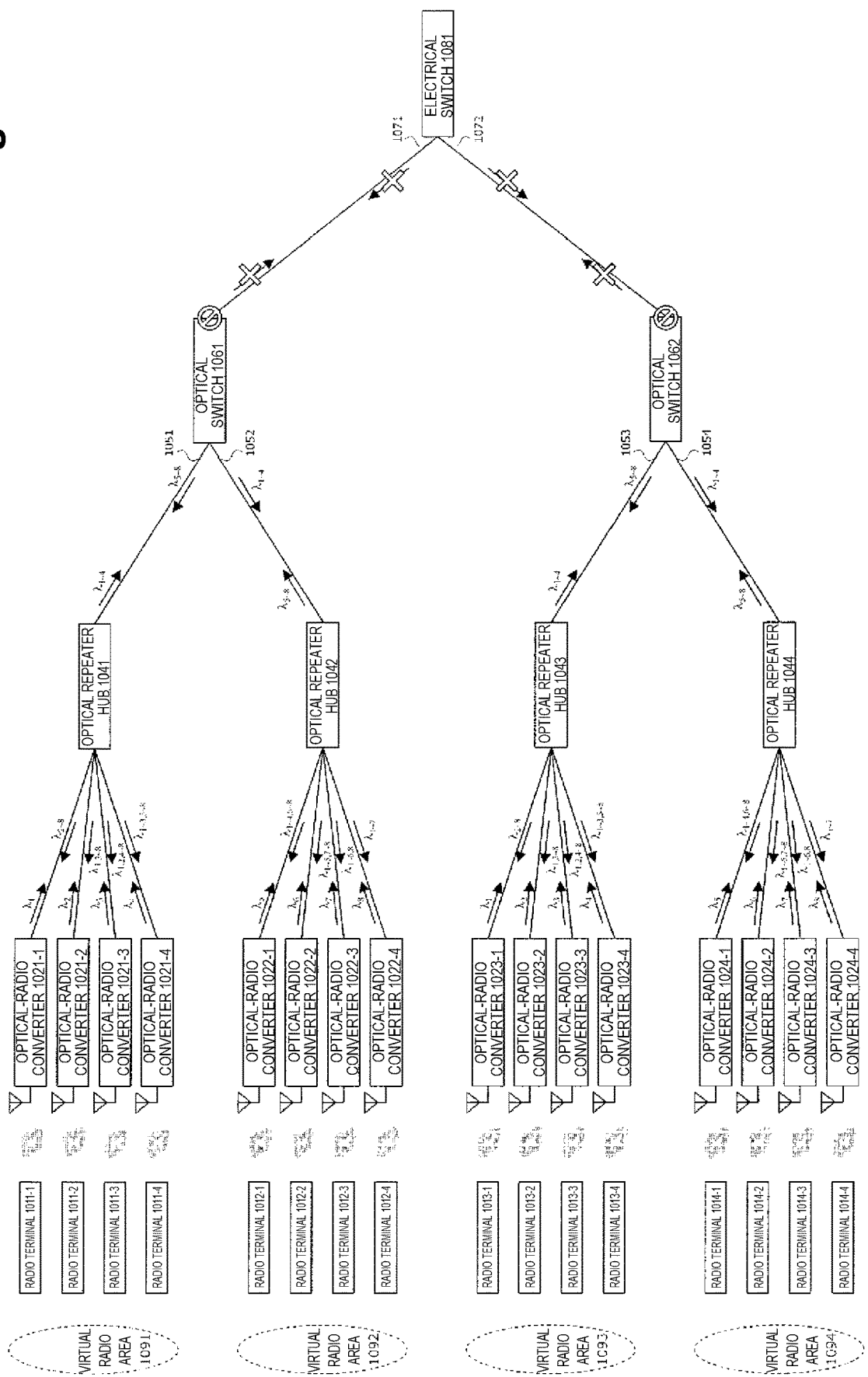
FIG. 19 shows a first example of specific operation in FIG. 18.

FIG. 19 is a diagram showing an example of specific operation in FIG. 18, and shows a design in a case where the virtual radio areas 1091 and 1092 are set as the same virtual radio area, and the virtual radio areas 1093 and 1094 are set as the same virtual radio area.

A design is employed such that the optical fiber radio signals 10101-1 to 10101-4 and 10102-1 to 10102-4 transmitted by the optical-radio converters 1021-1 to 1021-4 and 1022-1 to 1022-4 have the optical wavelengths $\lambda_1$ to $\lambda_8$, respectively. A design is employed such that the optical fiber radio signals 10103-1 to 10103-4 and 10104-1 to 10104-4 transmitted by the optical-radio converters 1023-1 to 1023-4 and 1024-1 to 1024-4 have the optical wavelengths $\lambda_1$ to $\lambda_8$, respectively.

The optical repeater hub 1041 transmits, to the optical-radio converters 1021-1 to 1021-4, an optical fiber radio signal having the signal components and optical wavelengths other than the optical fiber radio signal transmitted from the optical-radio converter as the transmission source of the optical fiber radio signals 10101-1 to 10101-4, and transmits, to the optical switch 1061, the optical fiber radio signal 10121 having the signal components and optical wavelengths in which all the optical fiber radio signals 10101-1 to 10101-4 are multiplexed.

The optical repeater hub 1042 transmits, to the optical-radio converters 1022-1 to 1022-4, an optical fiber radio signal having the signal components and optical wavelengths other than the optical fiber radio signal transmitted from the optical-radio converter as the transmission source of the optical fiber radio signals 10102-1 to 10102-4, and transmits, to the optical switch 1061, the optical fiber radio signal 10122 having the signal components and optical wavelengths in which all the optical fiber radio signals 10102-1 to 10102-4 are multiplexed.

At this time, the optical switch 1061 performs control so that the optical fiber transmission lines 1051 and 1052 are conductive with each other, and the optical fiber radio signal 10131 has the same signal components and optical wavelengths as the optical fiber radio signal 10122. Further, the optical fiber radio signal 10132 has the same signal components and optical wavelengths as the optical fiber radio signal 10121.

As a result, the optical repeater hub 1041 also transmits the optical fiber radio signal 10131 to the optical-radio converters 1021-1 to 1021-4 on the lower side, and the optical repeater hub 1042 also transmits the optical fiber radio signal 10132 to the optical-radio converters 1022-1 to 1022-4 on the lower side, so that the optical fiber radio signals 10111-1 to 10111-4 and 10112-1 to 10112-4 become an optical fiber radio signal having all the signal components and optical wavelengths of the optical fiber radio signals 10101-1 to 10101-4 and 10102-1 to 10102-4 except the optical fiber radio signal transmitted from the optical-radio converter as the transmission source. In the optical-radio converters 1021-1 to 1021-4 and 1022-1 to 1022-4, the optical-radio conversion unit on the reception side selectively receives the desired optical fiber radio signal using an optical wavelength filter or the like, thereby establishing communication so that the virtual radio areas 1091 and 1092 become the same virtual radio area.

Similarly for the virtual radio areas 1093 and 1094, the wavelengths and the routes of the optical switch are designed and controlled for optical fiber radio signals transmitted by their respective optical-radio converters, thereby establishing communication so that they become the same radio area.

With such a design and control, it is possible to enlarge the range of radio terminals among which communication can be established.

Figure 20:
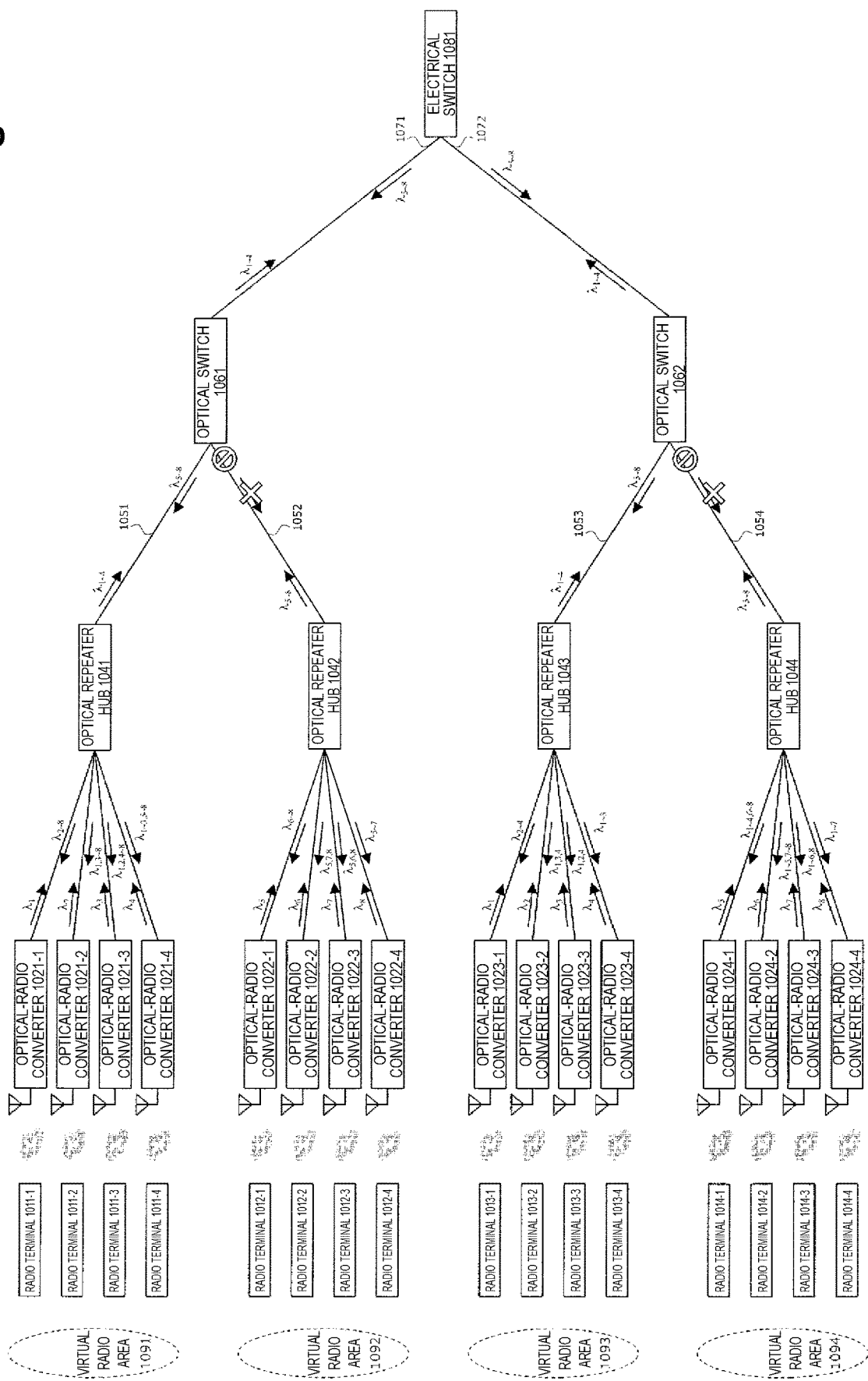
FIG. 20 shows a second example of specific operation in FIG. 18.

FIG. 20 is a diagram showing an example of specific operation in FIG. 18 that is different from that in FIG. 19, and shows a design in a case where the virtual radio areas 1091 and 1093 are set as the same virtual radio area.

A design is employed such that the optical fiber radio signals 10101-1 to 10101-4 and 10102-1 to 10102-4 transmitted by the optical-radio converters 1021-1 to 1021-4 and 1022-1 to 1022-4 have the optical wavelengths $\lambda_1$ to $\lambda_8$, respectively. A design is employed such that the optical fiber radio signals 10103-1 to 10103-4 and 10104-1 to 10104-4 transmitted by the optical-radio converters 1023-1 to 1023-4 and 1024-1 to 1024-4 have the optical wavelengths $\lambda_1$ to $\lambda_8$, respectively.

The optical repeater hub 1041 transmits, to the optical-radio converters 1021-1 to 1021-4, an optical fiber radio signal having the signal components and optical wavelengths other than the optical fiber radio signal transmitted from the optical-radio converter as the transmission source of the optical fiber radio signals 10101-1 to 10101-4, and transmits, to the optical switch 1061, the optical fiber radio signal 10121 having the signal components and optical wavelengths in which all the optical fiber radio signals 10101-1 to 10101-4 are multiplexed.

The optical repeater hub 1042 transmits, to the optical-radio converters 1022-1 to 1022-4, an optical fiber radio signal having the signal components and optical wavelengths other than the optical fiber radio signal transmitted from the optical-radio converter as the transmission source of the optical fiber radio signals 10102-1 to 10102-4, and transmits, to the optical switch 1061, the optical fiber radio signal 10122 having the signal components and optical wavelengths in which all the optical fiber radio signals 10102-1 to 10102-4 are multiplexed.

At this time, the optical switch 1061 performs control so that the optical fiber transmission lines 1051 and 1071 are conductive with each other, and the optical fiber radio signal 10131 has the same signal components and optical wavelengths as the optical fiber radio signal 10151. Further, the optical fiber radio signal 10132 becomes no signal.

The optical repeater hub 1043 transmits, to the optical-radio converters 1023-1 to 1023-4, an optical fiber radio signal having the signal components and optical wavelengths other than the optical fiber radio signal transmitted from the optical-radio converter as the transmission source of the optical fiber radio signals 10103-1 to 10103-4, and transmits, to the optical switch 1062, the optical fiber radio signal 10123 having the signal components and optical wavelengths in which all the optical fiber radio signals 10103-1 to 10103-4 are multiplexed.

The optical repeater hub 1044 transmits, to the optical-radio converters 1024-1 to 1024-4, an optical fiber radio signal having the signal components and optical wavelengths other than the optical fiber radio signal transmitted from the optical-radio converter as the transmission source of the optical fiber radio signals 10104-1 to 10104-4, and transmits, to the optical switch 1062, the optical fiber radio signal 10124 having the signal components and optical wavelengths in which all the optical fiber radio signals 10104-1 to 10104-4 are multiplexed.

At this time, the optical switch 1062 performs control so that the optical fiber transmission lines 1053 and 1072 are conductive with each other, and the optical fiber radio signal 10133 has the same signal components and optical wavelengths as the optical fiber radio signal 10152. Further, the optical fiber radio signal 10134 becomes no signal.

The electrical switch 1081 performs control so that the optical fiber transmission lines 1071 and 1072 are conductive with each other, and also performs control so that the optical wavelengths of an optical fiber radio signal are changed for transmission, and it converts the fiber radio signal 10141 having the optical wavelengths $\lambda_1$ to $\lambda_4$ into the fiber radio signal 10152 having the same signal components and different optical wavelengths $\lambda_5$ to $\lambda_8$ and transmits it to the optical switch 1062, and converts the fiber radio signal 10142 having the optical wavelengths $\lambda_1$ to $\lambda_4$ into the fiber radio signal 10151 having the same signal components and different optical wavelengths $\lambda_5$ to $\lambda_8$ and transmits it to the optical switch 1061.

As a result, the optical repeater hub 1041 also transmits the optical fiber radio signal 10131 having the same signal components and optical wavelengths as the optical fiber radio signal 10151 to the optical-radio converters 1021-1 to 1021-4 on the lower side, and the optical repeater hub 1043 also transmits the optical fiber radio signal 10133 having the same signal components and optical wavelengths as the optical fiber radio signal 10152 to the optical-radio converters 1023-1 to 1023-4 on the lower side, so that the optical fiber radio signals 10111-1 to 10111-4 and 10113-1 to 10113-4 become an optical fiber radio signal having all the signal components of the optical fiber radio signals 10101-1 to 10101-4 and 10103-1 to 10103-4 except the optical fiber radio signal transmitted from the optical-radio converter as the transmission source and having partially different optical wavelengths. In the optical-radio converters 1021-1 to 1021-4 and 1023-1 to 1023-4, the optical-radio conversion unit on the reception side selectively receives the desired optical fiber radio signal using an optical wavelength filter or the like, thereby establishing communication so that the virtual radio areas 1091 and 1093 become the same virtual radio area.

FIG. 19 and FIG. 20 are examples, and the methods of connecting virtual radio areas can be changed in any desired manner using design of optical wavelengths, arrangement of path controllers, connection configuration of optical fiber transmission lines, design of route control, or the like. Further, the equipment configuration is also not limited to that in FIG. 17 as described in the fifth embodiment, and a form is possible in which various numbers of stages, arrangements of path controllers, numbers of optical-radio converters, and the like are mixedly present.

INDUSTRIAL APPLICABILITY

The present disclosure can be applied to the information and communication industry.

REFERENCE SIGNS LIST

111, 112, 211, 212, 311, 312, 411-1, 411-2, **411-*n*, 511-1, 511-2, 511-*n*, 611-*n*, 611-2, 611-*n*, 711-1, 711-*m*, 711-*m*+1, 711-*n*, 711-*p*, 711-*q*, 811-1, 811-*m*, 811-*m*+1, 811-*n*, 811-*p*, 811-*q*, 911-1, 911-*m*, 911-*m*+1, 911-*n*, 911-*p*, 911-*q*, 1011-1, 1011-2, 1011-3, 1011-4, 1012-1, 1012-2, 1012-3, 1012-4, 1013-1, 1013-2, 1013-3, 1013-4, 1014-1, 1014-2, 1014-3, 1014-4** Radio terminal
121, 122 Radio master device
141, 142, 241, 242, 243 Transmission function unit
151 Relay network
221, 222, 223 Radio relay
131, 132, 231, 232, 233, 234, 235, 236, 561 Antenna unit
321, 322, 421-1, 421-2, **421-*n*, 521-1, 521-2, 521-*n*, 621-1, 621-2, 621-*n*, 721-1, 721-*m*, 721-*m*+1, 721-*n*, 721-*p*, 721-*q*, 821-1, 821-*m*, 821-*m*+1, 821-*n*, 821-*p*, 821-*q*, 921-1, 921-*m*, 921-*m*+1, 921-*n*, 921-*p*, 921-*q*, 1021-1, 1021-2, 1021-3, 1021-4, 1022-1, 1022-2, 1022-3, 1022-4, 1023-1, 1023-2, 1023-3, 1023-4, 1024-1, 1024-2, 1024-3, 1024-4** Optical-radio converter
371, 431-1, 431-2, **431-*n*, 531-1, 531-2, 531-*n*, 631-1, 631-2, 631-*n*, 731-1, 731-*m*, 731-*m*+1, 731-*n*, 731-*p*, 731-*q*, 751-1, 751-2, 751-*x*, 831-1, 831-*m*, 831-*m*+1, 831-*n*, 831-*p*, 831-*q*, 851-1, 851-2, 851-*x*, 931-1, 931-*m*, 931-*m*+1, 931-*n*, 931-*p*, 931-*q*, 951-1, 951-2, 951-*x*, 1031-1, 1031-2, 1031-3, 1031-4, 1032-1, 1032-2, 1032-3, 1032-4, 1033-1, 1033-2, 1033-3, 1033-4, 1034-1, 1034-2, 1034-3, 1034-4** Optical fiber transmission line
331, 333, 551 Transmission antenna
332, 334, 552 Reception antenna
571 Cancel circuit
361, 362, 581, 651-1, 651-2, **651-*n*** Optical-radio conversion unit
441, 1041, 1042, 1043, 1044 Optical repeater hub
541, 741-1, 741-2, **741-*x*, 761, 1061, 1062** Optical switch
641, 841-1, 841-2, **841-*x*, 861, 1081** Electrical switch
661 Electrical switch unit
941-1, 941-2, **941-*x*, 961** Path controller
1611 Brancher
1621 Delayer
1631 Attenuator
1641 Combiner

The invention claimed is:

1. A communication network system comprising:
   a plurality of optical-radio converters that convert a radio signal and an optical fiber radio signal into each other; and
   a path controller that is connected to the plurality of optical-radio converters through optical fiber transmission lines, receives input of an optical fiber radio signal transmitted from any optical-radio converter of the plurality of optical-radio converters from the optical fiber transmission line connected to the optical-radio converter, and outputs the optical fiber radio signal to the optical fiber transmission line connected to a set optical-radio converter of the plurality of optical-radio converters,
   wherein the plurality of optical-radio converters each comprise:
   an antenna unit that transmits/receives a radio signal to/from a radio terminal;
   an optical-radio converter-side optical-radio conversion unit that converts a radio signal received by a first antenna of the antenna unit into an optical fiber radio signal to output the optical fiber radio signal to the optical fiber transmission line, and converts an optical fiber radio signal transmitted in the optical fiber transmission line into a radio signal to output the radio signal to a second antenna of the antenna unit; and
   a wraparound signal suppression circuit that branches the radio signal output from the optical-radio converter-side optical-radio conversion unit to the second antenna of the antenna unit, and suppresses a wraparound radio signal generated by the radio signal output to the second antenna of the antenna unit being received by the first antenna of the antenna unit using the branched radio signal.

2. The communication network system according to claim 1, wherein the path controller comprises an optical switch that sets a conduction route between freely-selected optical fiber transmission lines of the plurality of connected optical fiber transmission lines.

3. The communication network system according to claim 1, wherein
the path controller comprises:
a plurality of path controller-side optical-radio conversion units that are provided for respective optical fiber transmission lines, and each of which is connected to a predetermined optical fiber transmission line, converts an optical fiber radio signal input from the optical fiber transmission line into a radio signal, and converts the radio signal into an optical fiber radio signal to output the optical fiber radio signal to the optical fiber transmission line; and
an electrical switch unit that outputs radio signals converted by the plurality of path controller-side optical-radio conversion units, to the path controller-side optical-radio conversion unit determined by the optical fiber transmission line as an output destination.

4. A communication network system comprising:
a plurality of communication networks each in which a plurality of optical-radio converters that convert a radio signal and an optical fiber radio signal into each other are connected to an optical repeater hub, and the optical repeater hub transmits an optical fiber radio signal transmitted from any optical-radio converter included in the plurality of optical-radio converters to optical-radio converters other than a transmission source of the plurality of optical-radio converters; and
a path controller that is connected to the optical repeater hubs provided in the plurality of communication networks through optical fiber transmission lines, receives input of an optical fiber radio signal transmitted from any optical repeater hub of the plurality of optical repeater hubs from the optical fiber transmission line connected to the optical repeater hub, and outputs the optical fiber radio signal to the optical fiber transmission line connected to a set optical repeater hub of the plurality of optical repeater hubs,
wherein the plurality of optical-radio converters each comprise:
an antenna unit that transmits/receives a radio signal to/from a radio terminal;
an optical-radio converter-side optical-radio conversion unit that converts a radio signal received by a first antenna of the antenna unit into an optical fiber radio signal to output the optical fiber radio signal to the optical fiber transmission line, and converts an optical fiber radio signal transmitted in the optical fiber transmission line into a radio signal to output the radio signal to a second antenna of the antenna unit; and
a wraparound signal suppression circuit that branches the radio signal output from the optical-radio converter-side optical-radio conversion unit to the second antenna of the antenna unit, and suppresses a wraparound radio signal generated by the radio signal output to the second antenna of the antenna unit being received by the first antenna of the antenna unit using the branched radio signal.

5. A communication network system comprising:
a plurality of optical-radio converters that convert a radio signal and an optical fiber radio signal into each other; and
a path controller that is connected to the plurality of optical-radio converters through optical fiber transmission lines, receives input of an optical fiber radio signal transmitted from any optical-radio converter of the plurality of optical-radio converters from the optical fiber transmission line connected to the optical-radio converter, and outputs the optical fiber radio signal to the optical fiber transmission line connected to a set optical-radio converter of the plurality of optical-radio converters,
wherein
the plurality of optical-radio converters each comprise:
an antenna unit that transmits/receives a radio signal to/from a radio terminal;
an optical-radio converter-side optical-radio conversion unit that converts a radio signal received by a first antenna of the antenna unit into an optical fiber radio signal to output the optical fiber radio signal to the optical fiber transmission line, and converts an optical fiber radio signal transmitted in the optical fiber transmission line into a radio signal to output the radio signal to a second antenna of the antenna unit; and
a wraparound signal suppression circuit that branches a radio signal output from the second antenna of the antenna unit to the optical-radio converter-side optical-radio conversion unit, and suppresses a wraparound optical fiber radio signal generated by the radio signal output from the second antenna of the antenna unit to the optical-radio converter-side optical-radio conversion unit being received by the first antenna of the antenna unit provided in the set optical-radio converter of the plurality of optical-radio converters using the branched radio signal.

6. The communication network system according to claim 5, wherein
the path controller comprises an optical switch that sets a conduction route between freely-selected optical fiber transmission lines of the plurality of connected optical fiber transmission lines.

7. The communication network system according to claim 5, wherein
the path controller comprises:
a plurality of path controller-side optical-radio conversion units that are provided for respective optical fiber transmission lines, and each of which is connected to a predetermined optical fiber transmission line, converts an optical fiber radio signal input from the optical fiber transmission line into a radio signal, and converts the radio signal into an optical fiber radio signal to output the optical fiber radio signal to the optical fiber transmission line; and
an electrical switch unit that outputs radio signals converted by the plurality of path controller-side optical-radio conversion units, to the path controller-side optical-radio conversion unit determined by the optical fiber transmission line as an output destination.

* * * * *